United States Patent
Nomura

(10) Patent No.: US 7,698,060 B2
(45) Date of Patent: *Apr. 13, 2010

(54) MAP DATA PRODUCT AND MAP DATA PROCESSING DEVICE

(75) Inventor: Takashi Nomura, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 42 days.

This patent is subject to a terminal disclaimer.

(21) Appl. No.: 10/529,365

(22) PCT Filed: Sep. 25, 2003

(86) PCT No.: PCT/JP03/12265

§ 371 (c)(1),
(2), (4) Date: Mar. 28, 2005

(87) PCT Pub. No.: WO2004/029913

PCT Pub. Date: Apr. 8, 2004

(65) Prior Publication Data
US 2005/0270306 A1 Dec. 8, 2005

(30) Foreign Application Priority Data
Sep. 27, 2002 (JP) ............................. 2002-282946

(51) Int. Cl.
*G01C 21/30* (2006.01)
*G01C 21/32* (2006.01)
(52) U.S. Cl. .................. 701/210; 701/26; 701/208; 701/209; 345/428; 340/995.15
(58) Field of Classification Search ................ 701/207, 701/208–210, 211, 212, 26; 340/990, 995.1, 340/995.14, 995.19, 995.15; 707/102; 345/619, 345/428
See application file for complete search history.

(56) References Cited

U.S. PATENT DOCUMENTS 5,475,598 A * 12/1995 Fushimi et al. ............. 701/202
6,072,409 A * 6/2000 Fushimi et al. ......... 340/995.19

(Continued)

FOREIGN PATENT DOCUMENTS

CA   2583246 A1 *  9/2007

(Continued)

OTHER PUBLICATIONS

Draft Standard for Information Technology-Portable Operating System Interface (POSIX®)—Draft Technical Standard: Base Specifications, Issue 7; 2008.*

(Continued)

*Primary Examiner*—Cuong H Nguyen
(74) *Attorney, Agent, or Firm*—Crowell & Moring LLP

(57) ABSTRACT

A data product that can be read by a computer or a map data processing apparatus, contains map data including map-related information related to a map. And the map-related information includes a compilation of a plurality of information elements of a single type; the map-related information can be updated in units of the individual information elements at the map data processing apparatus; and the map-related information includes management information used to manage the map-related information, which is also updated when the map-related information is updated in units of the individual information elements.

17 Claims, 18 Drawing Sheets

U.S. PATENT DOCUMENTS

| | | | |
|---|---|---|---|
| 6,188,316 B1 * | 2/2001 | Matsuno et al. | 340/441 |
| 6,282,492 B1 * | 8/2001 | Gorai et al. | 701/209 |
| 6,546,334 B1 | 4/2003 | Fukuchi et al. | |
| 7,072,977 B1 * | 7/2006 | Bernard et al. | 709/238 |
| 2002/0091485 A1 * | 7/2002 | Mikuriya et al. | 701/208 |
| 2005/0203937 A1 * | 9/2005 | Nomura | 707/102 |
| 2006/0161344 A1 * | 7/2006 | Iwahori et al. | 701/211 |
| 2006/0173614 A1 * | 8/2006 | Nomura | 701/210 |
| 2006/0217879 A1 * | 9/2006 | Ikeuchi et al. | 701/208 |
| 2007/0093960 A1 * | 4/2007 | Atarashi | 701/211 |
| 2007/0106463 A1 * | 5/2007 | Nomura | 701/208 |
| 2007/0168121 A1 * | 7/2007 | Adachi | 701/208 |
| 2007/0198181 A1 * | 8/2007 | Shimamura | 701/211 |
| 2007/0229490 A1 * | 10/2007 | Boudreau et al. | 345/418 |
| 2008/0015770 A1 * | 1/2008 | Nomura | 701/200 |
| 2008/0091344 A1 * | 4/2008 | Mikuriya et al. | 701/208 |

FOREIGN PATENT DOCUMENTS

| | | |
|---|---|---|
| CN | 101127952 A * | 2/2008 |
| EP | 1134674 | 9/2001 |
| EP | 1840513 A1 * | 10/2007 |
| JP | 04-046379 | 2/1992 |
| JP | H08 095488 | 4/1996 |
| JP | H08 292718 | 11/1996 |
| JP | 9-145383 A | 6/1997 |
| JP | H08 044846 | 2/1998 |
| JP | H10 122887 | 5/1998 |
| JP | 10-177337 A | 6/1998 |
| JP | H10 171347 | 6/1998 |
| JP | H10 187033 | 7/1998 |
| JP | H10 332404 | 12/1998 |
| JP | 11-024554 | 1/1999 |
| JP | H11 045048 | 2/1999 |
| JP | 11-95657 A | 4/1999 |
| JP | H11 148833 | 6/1999 |
| JP | 11-295084 A | 10/1999 |
| JP | 2000-36097 A | 2/2000 |
| JP | 2000-284685 | 10/2000 |
| JP | 2001-12957 A | 1/2001 |
| JP | 2001084491 A * | 3/2001 |
| JP | 2001 109373 | 4/2001 |
| JP | 2001 242784 | 9/2001 |
| JP | 2001 288168 | 9/2001 |
| JP | 2002-206938 | 7/2002 |
| JP | 2002-207423 A | 7/2002 |
| JP | 2005024555 A * | 1/2005 |
| TW | 200808007 A * | 2/2008 |

OTHER PUBLICATIONS

Draft Standard for Local and Metropolitan Area Networks: Media Independent Handover Services; 2008.*

A survey of indoor positioning systems for wireless personal networks; Yanying Gu; Lo, A.; Niemegeers, I.; Communications Surveys & Tutorials, IEEE; vol. 11, Issue 1, First Quarter 2009 pp.13 - 32; Digital Object Identifier 10.1109/SURV.2009.090103.*

Genetic Algorithm Based Secure Authentication Protocol with Dual Central Server and Token Authentication in Large Scale Mobile Ad-Hoc Networks; Panda, S.; Rajappa, V.; Biradar, A.; Global Telecommunications Conference, 2008. IEEE GLOBECOM 2008. IEEE; Nov. 30, 2008-Dec. 4, 2008 pp.1 - 6; Digital Object Identifier 10.1109/GLOCOM.2008.ECP.1061.*

Towards holistic Web-based information retrieval: an agent-based approach; Kwang Mong Sim; Web Intelligence, 2003. WI 2003. Proceedings. IEEE/WIC International Conference on, Oct. 13-17, 2003 pp. 39 - 46.*

Japanese Office Action dated Jun. 5, 2007 (Three (3) pages).

European Office Action dated Aug. 10, 2009 (three (3) pages).

* cited by examiner

FIG. 14
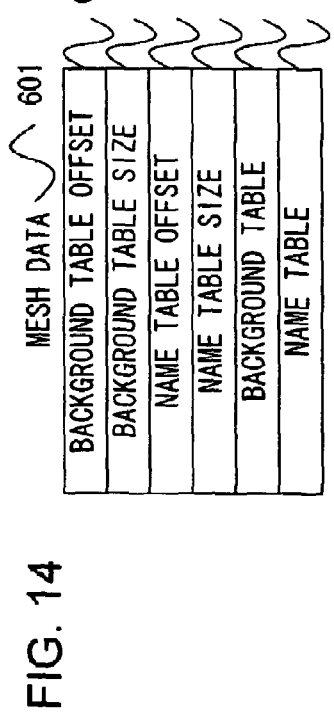
FIG. 15
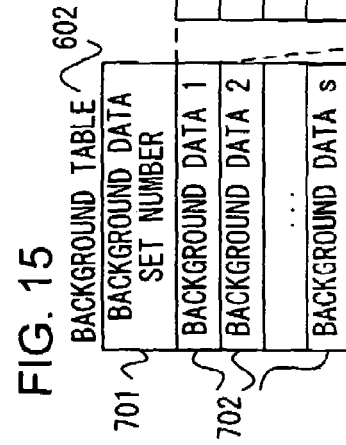
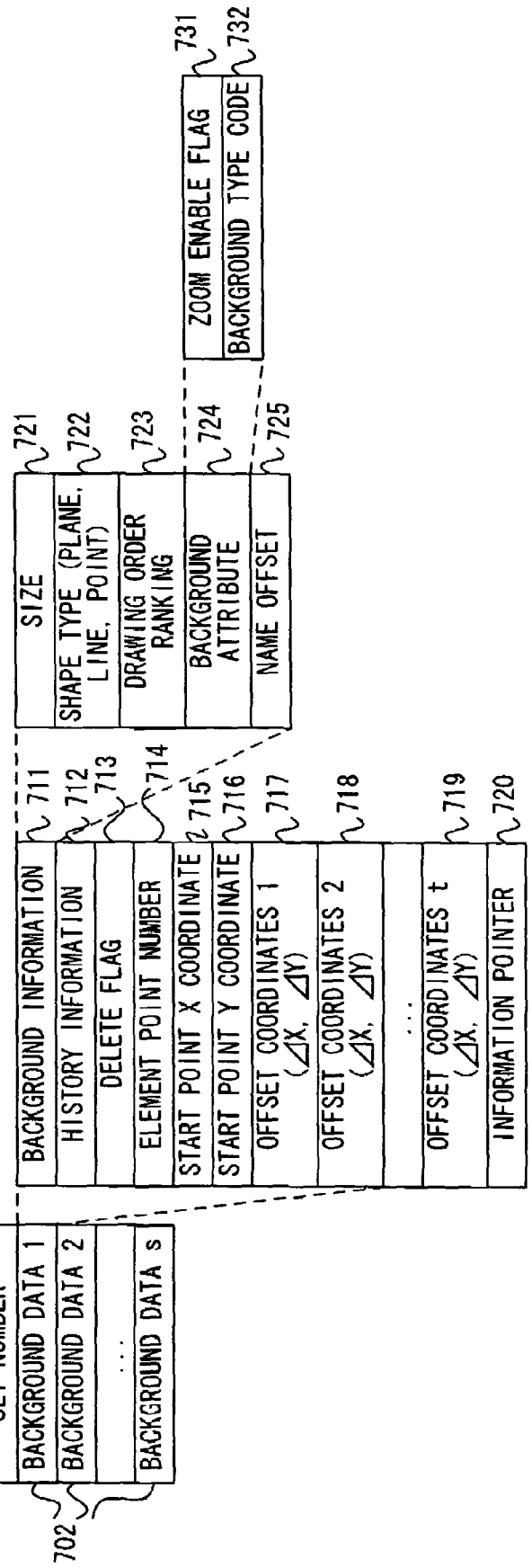

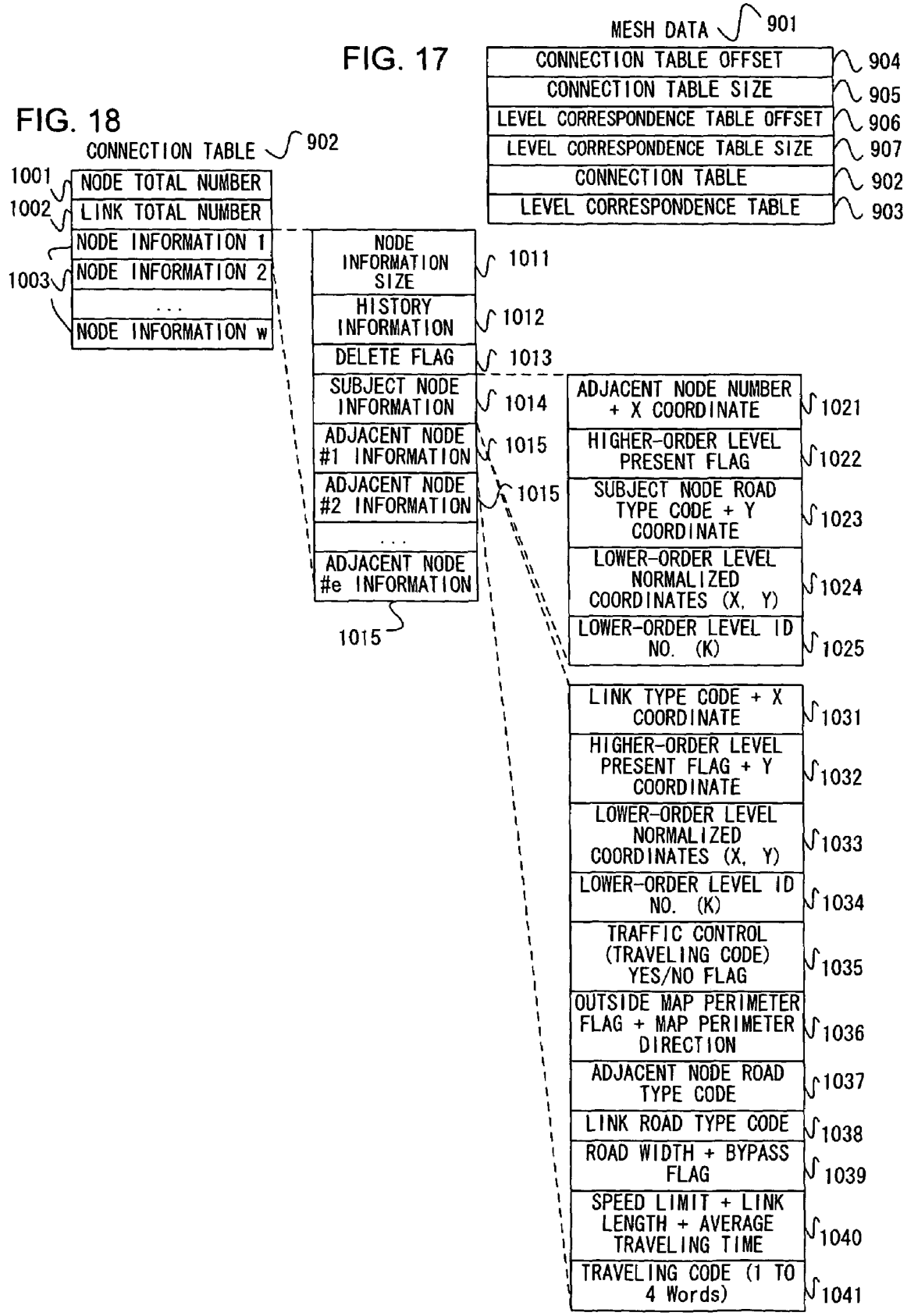

MAP DATA PRODUCT AND MAP DATA PROCESSING DEVICE

INCORPORATION BY REFERENCE

The disclosure of the following priority application is herein incorporated by reference: Japanese Patent Application No. 2002-282946 filed Sep. 27, 2002

TECHNICAL FIELD

The present invention relates to a map data product and a map data processing apparatus.

BACKGROUND ART

Map data of a road map and the like used in a navigation system are provided in a recording medium such as a CD-ROM or a DVD-ROM in the related art. In addition, map data are provided to a navigation system installed in a vehicle through communication.

However, a system through which a large volume of map data provided in a recording medium or the like can be partially updated with a high degree of efficiency has not been proposed in the related art.

DISCLOSURE OF THE INVENTION

The present invention provides a map data product and a map data processing apparatus that enable a highly efficient partial update of map data with a large data volume provided in a recording medium or the like.

The 1st data product according to the present invention that can be read by a computer or a map data processing apparatus, comprises: map data including map-related information related to a map, and: the map-related information includes a compilation of a plurality of information elements of a single type; the map-related information can be updated in units of the individual information elements at the map data processing apparatus; and the map-related information includes management information used to manage the map-related information, which is also updated when the map-related information is updated in units of the individual information elements.

In this data product, it is preferred that: roads are each indicated as a link string having one or more continuous links, with nodes representing points on the roads and each link representing a road portion connecting two adjacent nodes; and the information elements each correspond to information related to a link string. In this case, it is preferred that the information related to the link string includes node position information indicating a position of a node contained in the link string. Also, it is preferred that the information related to the link string includes guidance information related to the link string. Or, it is preferred that: a plurality of levels each corresponding to one of a plurality of scaling factors of the map are defined; a level corresponding to a scaling factor with a smaller value that renders the map as a wider area map is designated as a higher-order level; a plurality of sets of map-related information are provided each in correspondence to one of the plurality of levels; and the node position information included in the information related to the link string at a specific level contains node position information of a node at the specific level and node position information on a node at a lower-order level corresponding to the node at the specific level.

In the 1st data product, it is preferred that: the map-related information is information related to a background used to display a road map; and the information elements each constitute information related to a background object corresponding to a single display management unit. In this case, it is preferred that the information related to a background object corresponding to the single display management unit is information with regard to a single polygon, a single poly line or a single point related to the background. Also, it is preferred that: the information related to a background object corresponding to the single display management unit includes information indicating a drawing order; and the map-related information assumes a structure that allows a rearrangement of a plurality of sets of information each related to a background object corresponding to the single display management unit which are grouped together, in correspondence to the drawing order when one of the plurality of sets of information each related to a background object corresponding to the single display management unit is updated.

In the 1st data product, it is preferred that the information elements each correspond to information related to a single name used to display a road map. In this case, it is preferred that: the information related to a single name includes information indicating a drawing order; and the map-related information assumes a structure that allows a rearrangement of a plurality of sets of information each related to a single name which are grouped together, in correspondence to the drawing order when one of the plurality of sets of information related to a single name is updated.

In the 1st data product, it is preferred that: points on roads constitute nodes; the map-related information is information related to connections of the nodes used for route calculation; and the information elements each correspond to information managed in a single node unit. In this case, it is preferred that the information managed in the single node unit includes information related to a subject node and information related to a node adjacent to the subject node. Also, it is preferred that: a plurality of levels each corresponding to one of a plurality of scaling factors of the map are defined; a level corresponding to a scaling factor with a smaller value that renders the map as a wider area map is designated as a higher-order level; a plurality of sets of map-related information are provided each in correspondence to one of the plurality of levels; and node position information included in the information managed in the single node unit at a specific level contains node position information on a node at the specific level and node position information on a node at a lower-order level corresponding to the node at the specific level.

In the 1st data product, it is preferred that: points on roads constitute nodes; the map-related information is information related to connections of the nodes used for route calculation; a plurality of levels each corresponding to one of a plurality of scaling factors of the map are defined; a level corresponding to a scaling factor with a smaller value that renders the map as a wider area map is designated as a higher-order level; a plurality of sets of map-related information are provided each in correspondence to one of the plurality of levels; and the information elements each constitute information related to a node at a lower-order level corresponding to information related to a node at a specific level. In this case, it is preferred that node position information included in the information related to the node contains position information on the node at a level having contained therein the node and position information on a node at a lower-order level corresponding to the node at the level having contained therein the node.

The 2nd data product according to the present invention that can be read by a computer or a map data processing apparatus, comprises: map data including map-related information related to a map, and: points on roads constitute nodes and road portions extending between adjacent nodes are indicated as links; information used to identify each of the nodes includes node position information related to latitude and longitude; and information used to identify each of the links includes a combination of the node position information related to the latitude and longitude of a node at one end of a target link and the node position information related to the latitude and longitude of a node at another end of the target link.

In the 2nd data product, it is preferred that the information used to identify each of the links specifies a direction of the target link in correspondence to an order with which the node position information related to the latitude and longitude of the node at the one end of the target link and the node position information related to the latitude and longitude of the node at the other end of the target link are combined.

Also, it is preferred that: a plurality of levels each corresponding to one of a plurality of scaling factors of the map are defined; a level corresponding to a scaling factor with a smaller value that renders the map as a wider area map is designated as a higher-order level; a plurality of sets of map-related information are provided in each in correspondence to one of the plurality of levels; and the node position information at a specific level contains node position information on a node at the specific level and node position information on a node at a lower-order level corresponding to the node at the specific level.

In the above, it is preferred that the information elements each include identification information indicating whether information pertaining to a subject information element is valid or invalid.

It is preferred that the above data products are each a recording medium having recorded therein the map data.

A map data processing apparatus according to the present invention comprises: a recording medium drive means having loaded therein a recording medium that is a data product according to claim 20; an update data acquisition means for acquiring update data used to update map-related information in units of the individual information units; and a processing means for processing map data based upon the map data recorded in the recording medium and the update data acquired by the update data acquisition means.

BRIEF DESCRIPTION OF THE DRAWINGS

FIG. 14 shows the contents of the mesh data constituting the background/name data;

FIG. 15 shows the contents of the background table;

FIG. 17 shows the contents of mesh data constituting route calculation data;

FIG. 18 shows the contents of the connection table;

BEST MODE FOR CARRYING OF THE INVENTION

Figure 1:
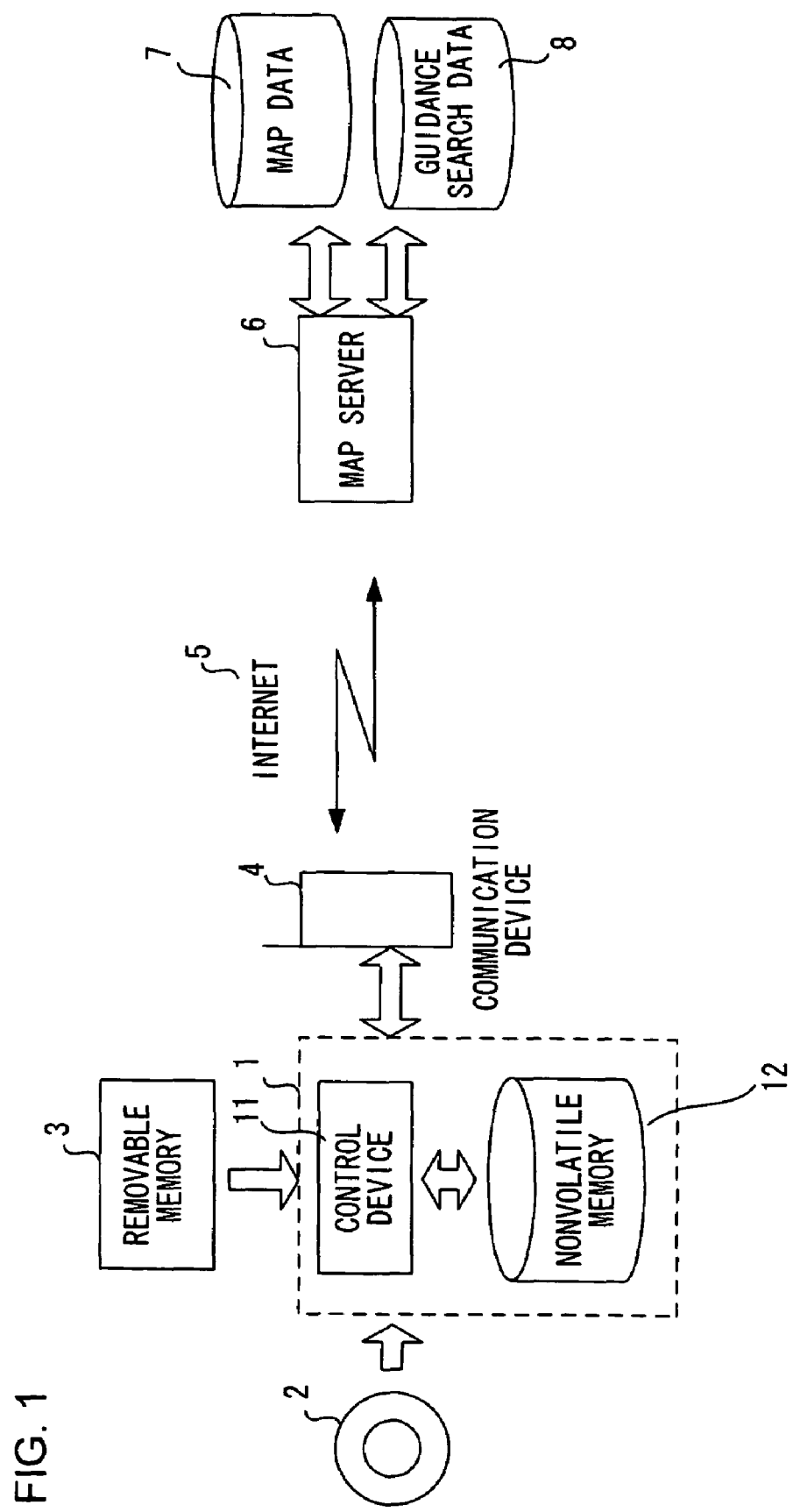
FIG. 1 shows how map data are exchanged.

FIG. 1 shows how map data such as map display data, guidance data and route calculation data are exchanged in an embodiment. An on-vehicle navigation system 1 reads map data, management information, guidance search data and the like from a recording medium 2 which may be a CD ROM or a DVD ROM. It receives update data to be used to update the map data and the like from a removable memory 3. The removable memory 3 is a detachable recording medium having recorded therein the update data or the like to be used to update part of the map data.

In addition, the navigation system 1 can be connected to a communication device 4 such as a portable telephone. The navigation system 1 can be connected to the Internet 5 via the communication device 4 and can be further connected with a map server 6 via the Internet 5. At the map server 6, map data from old versions up to and including the latest version of map data, are held at a map database 7, and guidance search data from old versions up to and including the most recent guidance search data, are held at a guidance search database 8. Thus, the map server 6 is capable of providing update data to be used to update part of the map data to the navigation system 1 via the Internet 5. It is to be noted that the guidance search data contain position information indicating the positions of POIs and the like and attribute information indicating the specific types, the names and the like of the POIs and the like.

The navigation system 1 includes a control device 11 and a nonvolatile memory 12. The control device 11 is constituted with a microprocessor and its peripheral circuits. The nonvolatile memory 12 is a nonvolatile memory such as a hard disk or a flash memory installed inside the navigation system 1. The nonvolatile memory 12 may be any type of storage device as long as data written therein are retained even when the power to the navigation system 1 is turned off.

Once the recording medium 2 is loaded into the navigation system 1, it remains loaded in the navigation system 1 until it is replaced with a new recording medium 2. Accordingly, it may be referred to as a fixed medium as opposed to the removable memory 3. The map database 7 and the guidance search database 8, which hold all the versions of map data and guidance search data, from the oldest to the most recent, are databases holding mother data. Using the data at the map database 7 and the guidance search database 8, the map server 6 can prepare a recording medium 2 having recorded therein initial (pre-update) map data or a removable memory 3 having stored therein update data to be used for data update.

Figure 2:
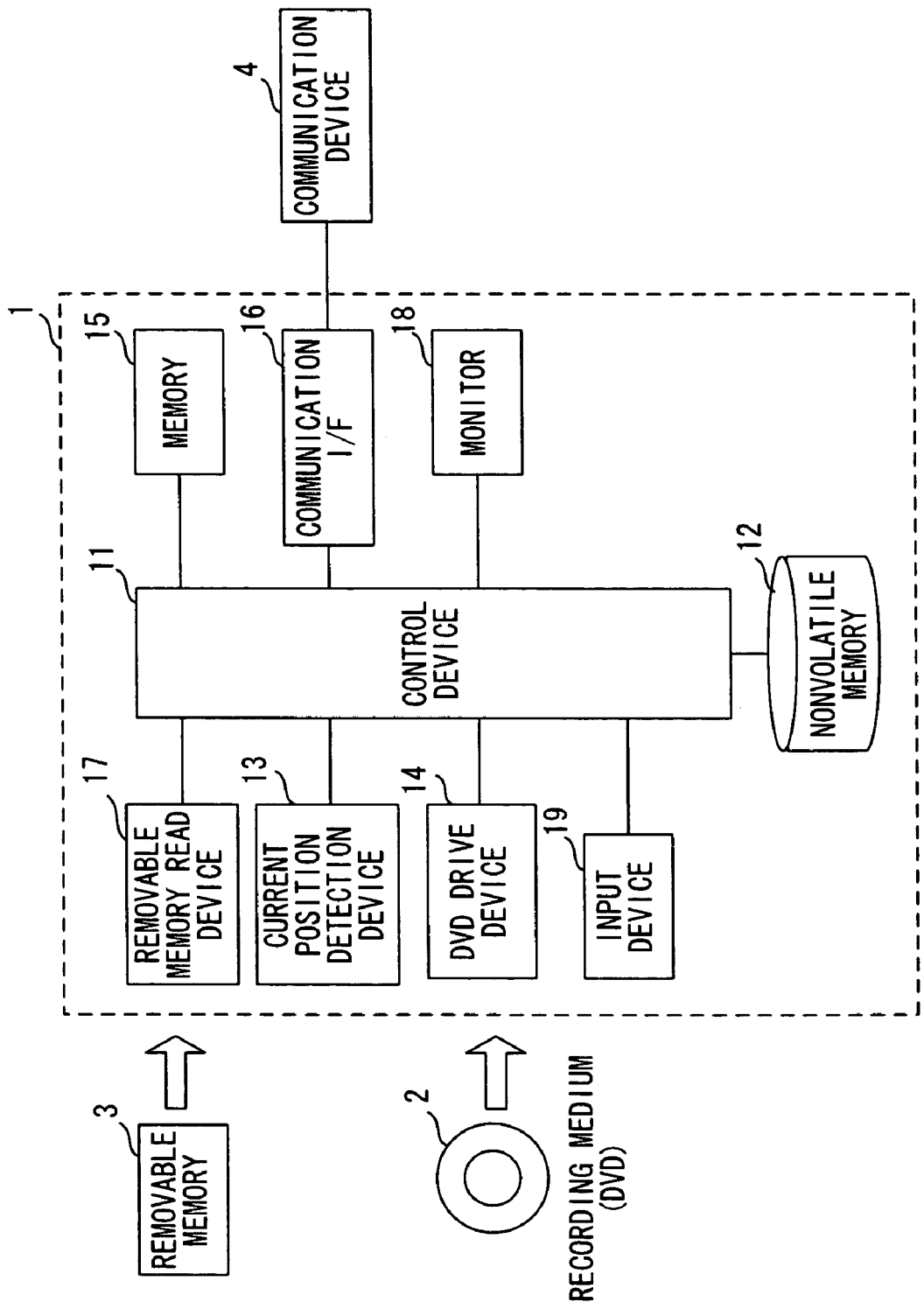
FIG. 2 is a block diagram of an on-vehicle navigation system.

FIG. 2 is a block diagram of the on-vehicle navigation system 1. The navigation system 1 comprises the control device 11, the nonvolatile memory 12, a current position detection device 13, a DVD drive device 14, a memory 15, a communication interface 16, a removable memory read device 17, a monitor 18 and an input device 19.

The current position detection device 13, which detects the current position of the vehicle, may be constituted with, for instance, an azimuth sensor that detects the advancing azimuth of the vehicle, a vehicle speed sensor that detects the vehicle speed, a GPS sensor that detects a GPS signal transmitted from a GPS (global positioning system) satellite and the like. The DVD drive device 14 reads map data and the like in the recording medium 2 loaded therein. In the embodiment, the recording medium 2 is a DVD ROM. However, the recording medium 2 may be a CD ROM or another type of recording medium.

The memory 15 is used to store the vehicle position information detected with the current position detection device 13 and the like and also to store node information, link information and the like of the nodes and the links on a recommended route calculated by the control device 11. In addition, a mesh management table which is to be detailed later is stored in the memory 15. The memory 15 constitutes a working area of the control device 11. The communication interface 16 is used to achieve a connection with the communication device 4. The use of a portable telephone and an Internet connection are enabled via the communication interface 16. Data in the removable memory 3 can be read with the removable memory read device 17 at which the removable memory 3 is loaded.

The monitor 18 is a display device at which a map, a recommended route and various types of information are displayed. The monitor 18 may be provided as an integrated part of the navigation system main unit or it may be provided as a separate casing. In addition, the monitor 18 disposed at an isolated position may be connected to the navigation system main unit through a cable or the like. Through the input device 19, the destination for the vehicle and the like are entered when conducting a route search. It may be constituted as a remote-control unit or it may be constituted as a touch panel disposed on the screen at the monitor 18. The control device 11 executes various types of navigation processing such as road map display, route calculation (route search) and route guidance by using the current vehicle position information detected with the current position detection device 13, the map data stored in the recording medium 2 or the nonvolatile memory 12. It is to be noted that a program of the various types of processing executed by the control device 11 is installed in a ROM (not shown) provided inside the control device 11.

-Map Data Structure-

The data structure adopted in the map data mentioned above is now explained in further detail. The map data are information related to maps and include road data, guidance data, background data, name data, route calculation data. The road data are used to display roads, specify the current vehicle position, and execute map matching and so on. The guidance data includes intersecting point names, road names, directional terms, directional guidance facility information and the like, and are used to provide guidance for the driver or the like along the recommended route based upon the calculated recommended route. The background data are used to display roads and a background in a road map. The name data includes geographic area names, building names and the like, and are used when displaying a road map. The route calculation, which are network data constituted with branching information and the like not directly relevant to the specific road shapes, are mainly used when calculating a recommended route (when executing a route search).

The map data are managed based upon a concept that they are provided at different levels in blocks and meshes in the embodiment. In the embodiment, the map data are divided into seven different levels of data, with each level corresponding to a specific scaling factor. Level 0 corresponds to the scaling factor at which the map is provided with the most detail, and at level 6, the map is provided as the widest-area map. While the different levels of map data are provided at varying scaling factors, a common area is covered by the various levels of map data. Namely, supposing that the subject area is the entire nation of Japan, map data of the entire nation of Japan are provided at each level with a scaling factor different from the scaling factors corresponding to the other levels. For instance, at level 0, map data of the entire nation of Japan are provided at a scaling factor of 1/6250, at level 1, map data of the entire nation of Japan are provided at a scaling factor of 1/25,000, at level 2, map data of the entire nation of Japan are provided at a scaling factor of 1/100,000, at level 3, map data of the entire nation of Japan are provided at a scaling factor of 1/400,000, at level 4, map data of the entire nation of Japan are provided at a scaling factor of 1/1,600,000, at level 5, map data of the entire nation of Japan are provided at a scaling factor of 1/6,400,000, and at level 6, map data of the entire nation of Japan are provided at a scaling factor of 1/128,000,000. In other words, seven sets of map data are provided in correspondence to levels 0 to 6. A level in the level 0 side is referred to as a lower level and a level in the level 6 side is referred to as a upper level.

Figure 3:
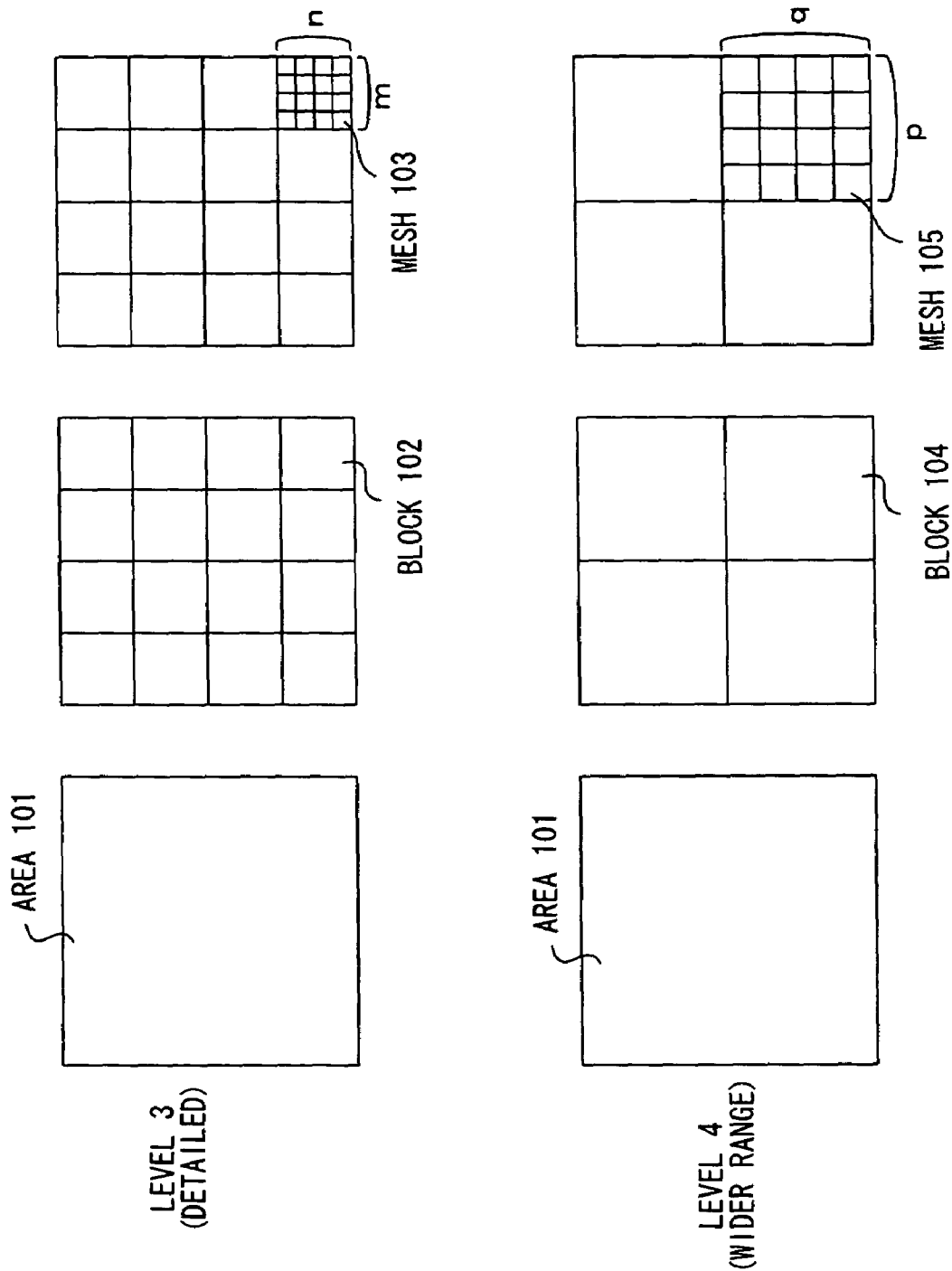
FIG. 3 is a conceptual diagram illustrating the relationships among the levels, the blocks and the meshes of the map data.

FIG. 3 is a conceptual diagram provided to facilitate an explanation of the relationships among the map data levels, blocks and meshes. FIG. 3 shows map data at levels 1 and 2 as an example. Reference numeral 101 indicates the subject area covered by the map data. Assuming that the map data cover the entire nation of Japan, the area 101 is a range that contains the entire nation of Japan. The same range of subject area is covered at levels 1 and 2. At level 1, the area 101 is managed as a plurality of blocks 102, i.e., 4×4=16 blocks. Each block 102 is divided into a plurality of meshes 103 and is managed with the meshes. In the embodiment, the data in the block are managed as m×n sets of mesh data. The blocks 102 of map data at the same level are each divided into m×n meshes.

At level 2, the area 101 is managed with a plurality of blocks 102, i.e., 2×2=4 blocks. Each block 104 is divided into a plurality of meshes 105 and is managed with the meshes. In the embodiment, the data in the block are managed as p×q sets of mesh data. The blocks 104 of map data at the same level are each divided into p×q meshes.

At levels 1 and 2, the area 101 is divided into different numbers of blocks and the individual blocks are divided into different numbers of meshes, since different volumes of data are handled at level 2 with a smaller scaling factor (a larger denominator) providing a wider area map and at level 1 with a larger scaling factor (a smaller denominator) providing a more detailed map compared to level 2. Namely, the map data are divided as appropriate in correspondence to the volume of data handled at each level. However, at a given level, the size of the individual blocks and the size of the individual meshes remain constant. It is to be noted that the numbers of blocks that the area 101 is divided into at the two levels in FIG. 3 simply represent an example and the area 101 may be divided into different numbers of blocks.

The direction along which the map data are divided vertically corresponds to the latitudinal direction, whereas the direction along which the map data are divided horizontally corresponds to the longitudinal direction. The terms "blocks" and "meshes" in this context are used for convenience in the explanation of the embodiment, and other terms may be used as well. Meshes may instead be referred to as parcels, or blocks may be referred to as first division units and meshes may be referred to as second division units. In addition, the blocks and meshes may be considered to be units obtained by geographically dividing the data.

Road/Guidance Data

The following is an explanation of the road data and the guidance data included in the map data. The road data and the guidance data provided at the different levels are managed in units of individual blocks and individual meshes. Road data and guidance data are prepared as mesh data in correspondence to each mesh. Simply put, blocks are managed by using a block management table, and a mesh management table is used to manage the individual meshes in each block.

Figure 4:
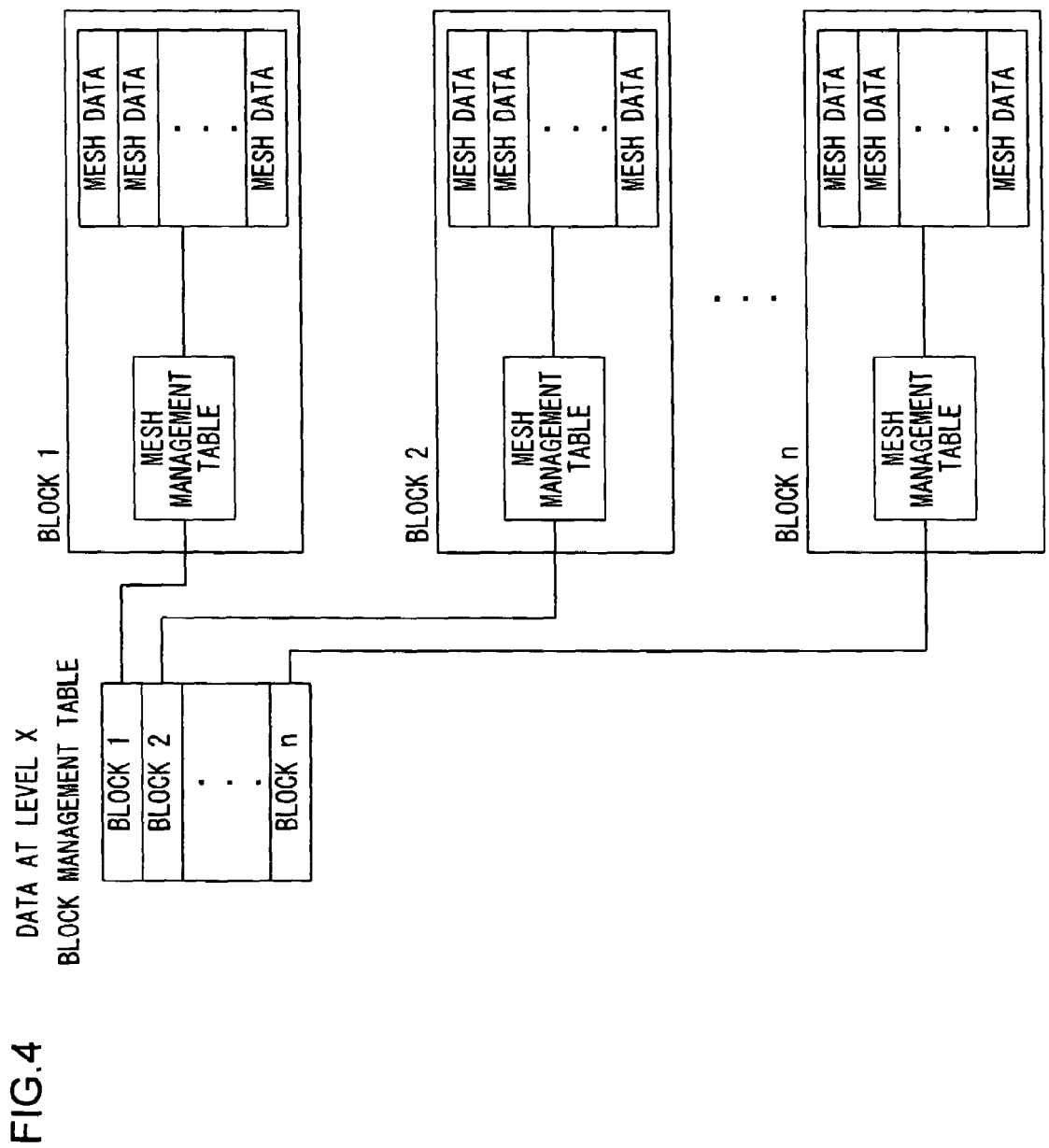
FIG. 4 is a conceptual diagram of the relationship among a block management table, mesh management tables and mesh data, which are managed with the mesh management tables.

FIG. 4 schematically illustrates the relationship among a block management table, mesh management tables and mesh data which are the data managed by using the mesh management tables. FIG. 4 shows that a single block management table is provided in correspondence to the data at level x. The block management table contains information related to all the blocks at this level. For instance, since there are 16 blocks at level 1, as shown in FIG. 3, 16 sets of block information are provided at level 1 in correspondence. Since each four blocks at level 1 constitute a single block for management at level 2, there are four blocks and four sets of block information are provided in correspondence at level 2. FIG. 4 also shows that a mesh management table is provided in correspondence to each block.

The meshes in a given block are managed by using the corresponding mesh management table. For instance, access to the recording medium 2 or the nonvolatile memory 12 to obtain mesh data is managed with the mesh management table. To be more precise, the mesh management table contains information with which the meshes are managed and the control device 11 manages the meshes by using the table.

Figure 5:
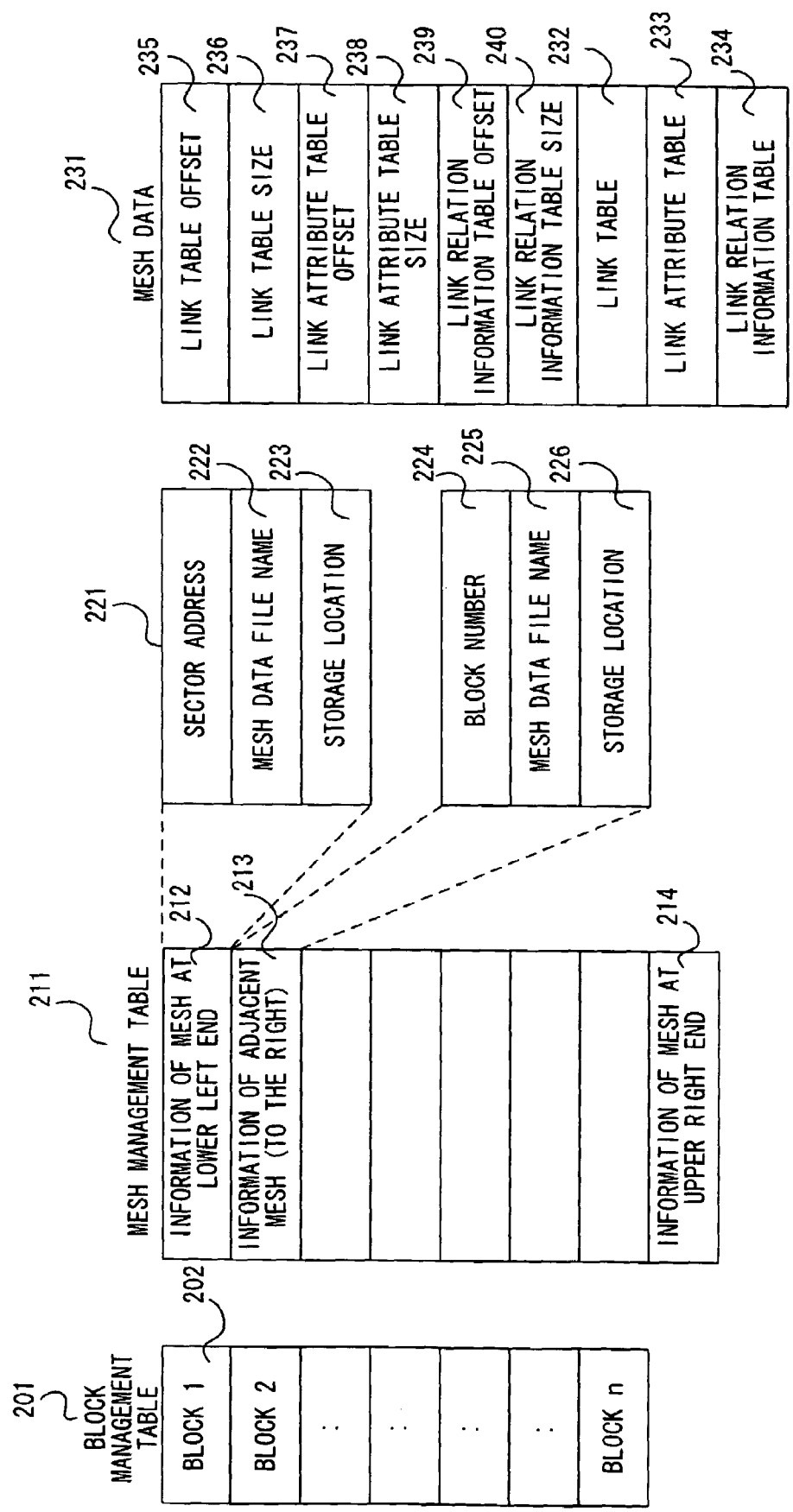
FIG. 5 provides a more detailed diagram illustrating the relationship among the block management table, a given mesh management table and the mesh data.

FIG. 5 illustrates in further detail the relationship among the block management table, a given mesh management table and the mesh data. A block management table 201 holds n sets of block management information 202. In correspondence to each block, a single mesh management table 211 is provided. In the mesh management table 211, sets of mesh information 212 to 214 are stored each in correspondence to a mesh. These sets of mesh information are stored in a specific order, by first storing the information for the mesh located at the lower left end in the block, sequentially storing the information corresponding to the meshes adjacent to the right, storing the information for the mesh at the left end in the row directly above the bottom row once the information for the mesh at the right end on the bottom row is stored, sequentially storing the information in the meshes adjacent to the right and finally storing the information for the mesh at the upper right end. In this example, the left side corresponds to west, the right side corresponds to east, the bottom side corresponds to south and the top side corresponds to north. The information 212 for the mesh at the lower left end is constituted with a sector address 221, a mesh data file name 222 and a storage location 223. The information 213 for the adjacent mesh (adjacent to the right) is constituted with a block number 224, a mesh data file name 225 and a storage location 226. The information for each subsequent mesh is constituted with a block number 224, a mesh data file name 225 and a storage location 226 as well.

It is to be noted that the recording medium 2 is managed by dividing the recording area into a plurality of sectors and dividing each sector into a plurality of blocks. The block number 224 indicates the number of blocks used by the immediately preceding set of mesh information. Accordingly, the storage location at which the mesh data in a desired mesh are stored on the recording medium 2 can be calculated as a cumulative value obtained by adding the numbers of blocks stored in the subsequent sets of mesh information to the leading sector address stored in the first set of mesh information 21.

As the storage location 223 or 226, identification information which enables identification of the location at which the mesh data corresponding to the specific mesh are recorded, i.e., whether the mesh data are recorded in the recording medium 2 or in the nonvolatile memory 12, is stored. If the mesh data are recorded in the nonvolatile memory 12, information indicating the storage address and the data size is also included. It is to be noted that instead of the storage locations 223 and 226, the mesh data file names 222 and 225 may be used as identification information when identifying the storage locations of the corresponding mesh data, i.e., whether they are recorded in the recording medium 2 or in the nonvolatile memory 12. For instance, if a given set of mesh data is still recorded in the recording medium 2 alone, NULL may be stored as the corresponding mesh data file name 222 or 225, and once the mesh data become recorded in the nonvolatile memory 12, the specific filename may be recorded. In this case, the program should first make a decision as to whether or not NULL is indicated for the file name 222 or 225, access the recording medium 2 if the filename is NULL, and access the nonvolatile memory 12 by using the filename stored therein as an index if the filename is not NULL.

Reference numeral 231 indicates mesh data. The mesh data 231 are basically constituted with a link table 232, a link attribute table 233 and a link relation information table 234. In order to enable access to the individual tables, information indicating a link table offset 235, a link table size 236, a link attribute table offset, a link attribute table size 238, a link relation information table offset 239 and a link relation information table size 240 is stored at the beginning of the mesh data. For instance, based upon the link table offset 235, the leading address of the link table 232 in the mesh data 231 can be ascertained and thus, data can be read in a volume corresponding to the value (e.g., the number of bytes) stored as the link table size 236. This principle applies to the other tables as well.

Figure 6:
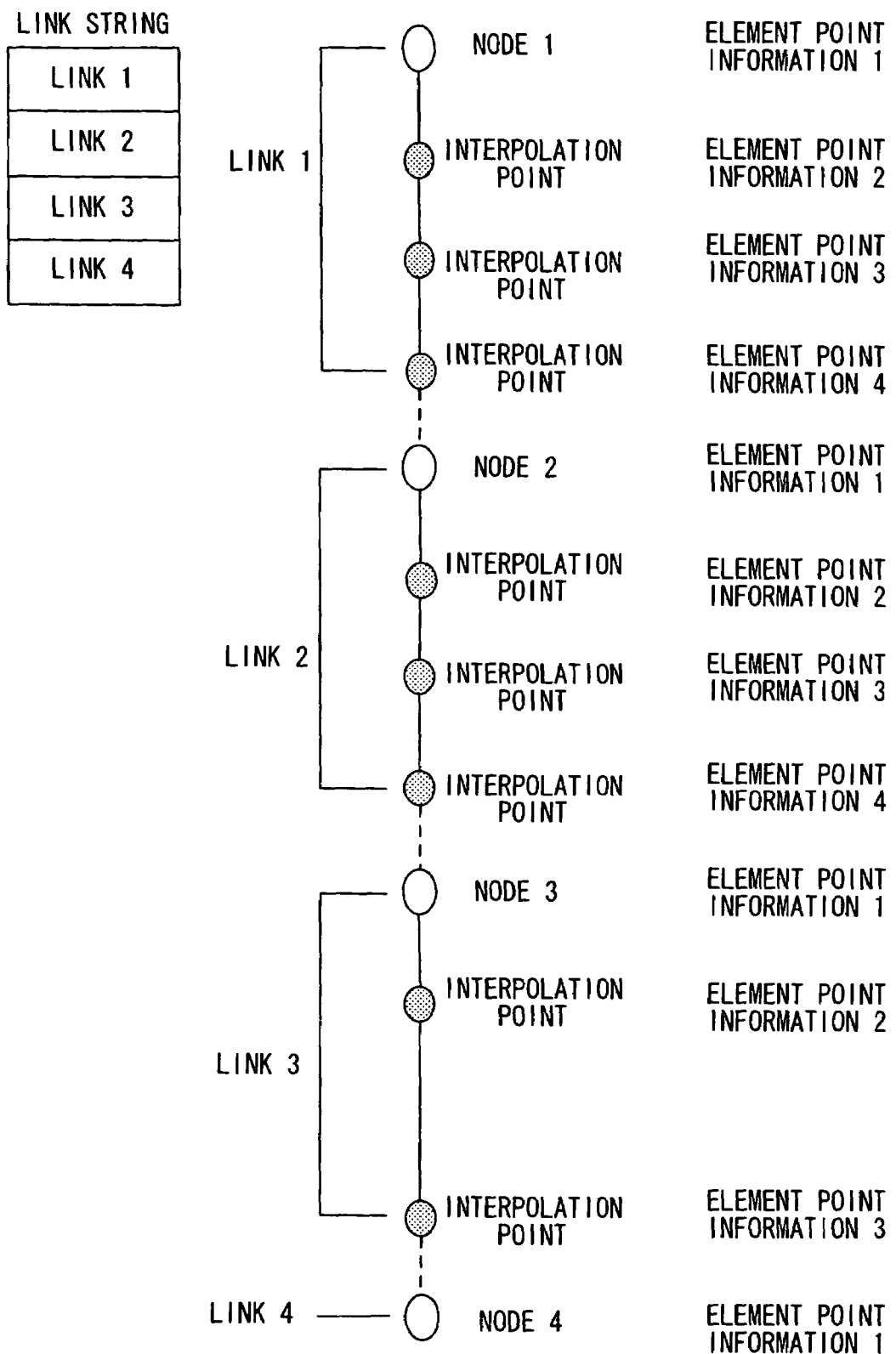
FIG. 6 presents examples of structures that may be adopted in link strings and links.

It is to be noted that a concept whereby a road is represented as a link string constituted with links and nodes is adopted in the embodiment. A node may be an intersection point or a special point set on the road. A link is equivalent to the portion of the road extending between adjacent nodes, and a link string expresses the road as a plurality of continuous links. Between nodes, interpolation points are set to interpolate position information and the like. FIG. 6 presents examples of structures that may be adopted in link strings and links.

Figure 7:
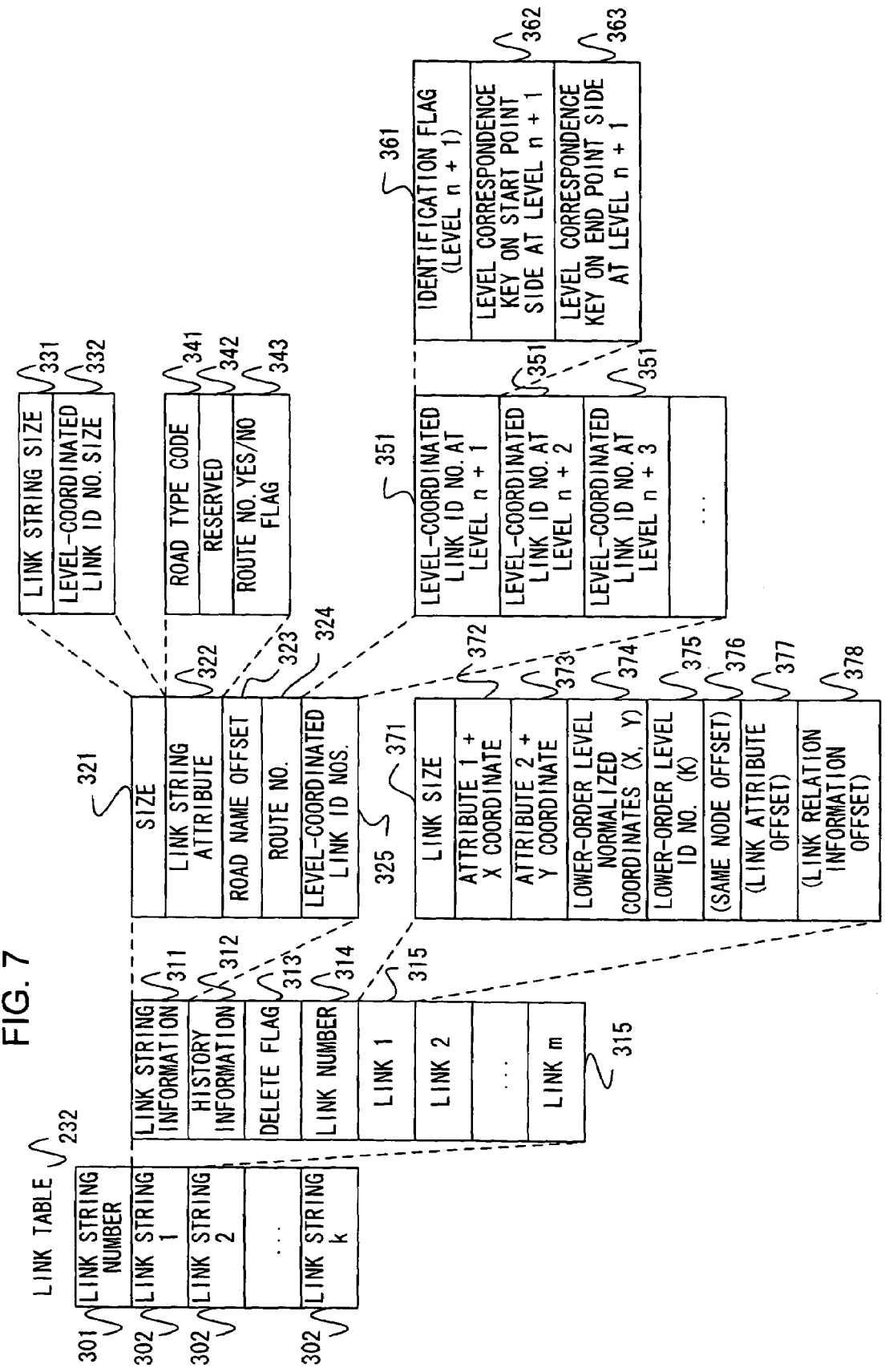
FIG. 7 shows the contents of the link table.

FIG. 7 shows the contents of the link table 232 in FIG. 5. The link table 232 holds information indicating a link string number 301, i.e., the total number of link strings present in the corresponding mesh, with link strings 301 each having stored therein data of a link string 1 to k. The data corresponding to each link string 302 are constituted with link string information 311, history information 312, a delete flag 313, a link number 314 and data of links 1 through m 315.

The link string information 311 is constituted with size data 321, link string attribute data 322, road name offset data 323, route No. data 324 and level-coordinated link ID No. data 325. The size data 321 indicates a link string size 331 and a size 332 of the level-coordinated link ID No. data. The link string attribute data 322 are constituted with a road type code 341, RESERVED data 342 and a route No. yes/no flag 343. As the level-coordinated link ID No. data 325, level-coordinated link ID Nos. 351 at all the higher-order levels relative to the subject level are stored. The level-coordinated link ID No. 351 for each lower-order level is constituted with an identification flag (level n+1) 361 used to identify the No. assigned to the level, a start point-side level correspondence key 362 at level n+1 and an end point-side level correspondence key 363 at level n+1. The level correspondence keys are to be explained in detail later.

Each set of link data 315 is constituted with information indicating a link size 371, an attribute 1+X coordinate 372, an attribute 2+Y coordinate 373, lower-order level normalized coordinates (X, Y) 374, a lower-order level ID No. (K) 375, a same node offset 376, a link attribute offset 377 and a link relation information offset 378. Access to the link attribute table to be detailed later is enabled based upon the link attribute offset 377, whereas access to the link relation information table to be detailed later is enabled based upon the link relation information offset 378.

The X coordinate 372 and the Y coordinate 373 are indicated as normalized coordinate values. When the mesh is divided into, for instance, 2048×2048 portions, a normalized coordinate assumes a value in the range of 0 to 2047. The position of the mesh is normally indicated as the latitude/longitude at the lower left corner of the mesh. Namely, position information indicating the latitude/longitude at the lower left corner of the mesh is stored (not shown) in the mesh management table 211. Normalized coordinate values in the mesh are measured relative to the lower left corner of the mesh set as the origin point. Thus, with the mesh position information indicating the latitude/longitude at the lower left corner, each set of normalized coordinates indicates a specific position in the map with two-dimensional coordinate values corresponding to the latitude/longitude. The two-dimensional coordinate values corresponding to the latitude/longitude can be regarded as universal values that remain unaffected by the differences among navigation system types and the differences among standards.

In addition to the normalized coordinate values of the X coordinate 372 and the Y coordinate 373, the lower-order level normalized coordinates (X, Y) 374 and the lower-order level ID No. (K) 375 are stored in the embodiment. Depending upon the resolution at a given higher-order level, a point with a pair of specific coordinates at the higher-order level may contain a plurality of nodes present in close proximity to one another at a lower-order level. For this reason, it may not always be possible to ascertain an accurate one-to-one correspondence between nodes at the higher-order level and the lower-order level. Accordingly, the lower-order level normalized coordinate data are included in the data at the higher-order level to make it possible to accurately ascertain the correspondence to the matching node at the lower-order level in the embodiment. The lower-order level ID No. (K) 375 is a parameter other than the normalized coordinates, which may be, for instance, height data indicating the height of the node at the lower-order level or time data (information) related to data generation/update, or both of these data may be provided as the lower-order level ID No. By incorporating in a specific combination the X coordinate 372, the Y coordinate 373, the lower-order level normalized coordinates (X, Y) 374 and the lower-order level ID No. (K) 375, the node at a given level can be identified with a high degree of reliability and an accurate level-to-level correspondence is defined with a high degree of reliability. The combined data are referred to as a level correspondence key in the embodiment. Since a level correspondence key is generated by incorporating the parameters at another level with a two-dimensional key at the subject level, it may be referred to as a 2.5-dimensional space key.

In the embodiment, these level correspondence keys are used to define the link ID Nos. of each link at a given level. The link ID No. along the forward direction is defined by the level correspondence key at a node located toward the link string start point and the level correspondence key at a node located toward the link string end point. The link ID No. along the reverse direction is defined by reversing the combination.

Figure 8:
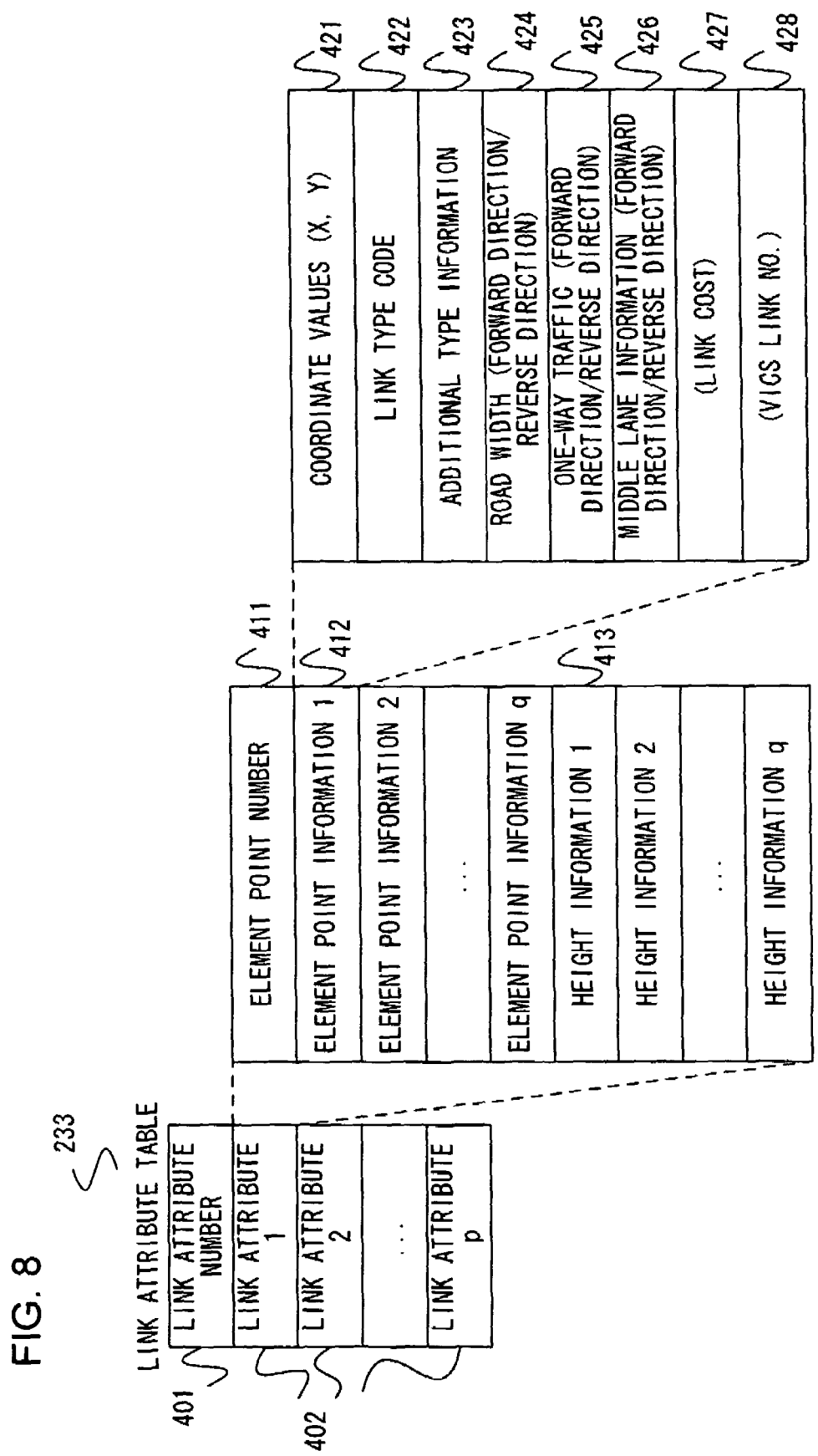
FIG. 8 shows the contents of the link attribute table.

Next, the link attribute table 233 in FIG. 5 is explained in detail. FIG. 8 shows the contents of the link attribute table 233. The link attribute table 233 is constituted with link attribute number 401 and link attribute data 402. In the link attribute table 233, attribute data related to all the links present in the subject mesh are stored, and the total number of sets of attribute data is indicated in the link attribute number 401, whereas attribute data corresponding to the individual links are stored as the link attribute data 402. Each set of link attribute data 401 is constituted with element point number data 411, element point information 412 provided in correspondence to each of the element points and height information 413 indicating the height of each element point. Each set of element point information 412 is constituted with coordinate values (X, Y) 421, a link type code 422, additional type information 423, road widths (forward direction/reverse direction) 424, one-way traffic (forward direction/reverse direction) 425, middle lane information (forward direction/reverse direction) 426, a link cost 427 and a VICS link No. 428.

It is to be noted that the term "element point" refers to a node or an interpolation point in FIG. 6. Since the link cost 427 and the VICS link No. 428 are information related to the link (not a sub link), they are only set in the element point information 1 corresponding to the starting node. At each middle point in the link string, information is held in correspondence to both the forward direction and the reverse direction. No information along the reverse direction is provided at the link string start point (link 1), and no information along the forward direction is provided at the link string end point (link m).

Figure 9:
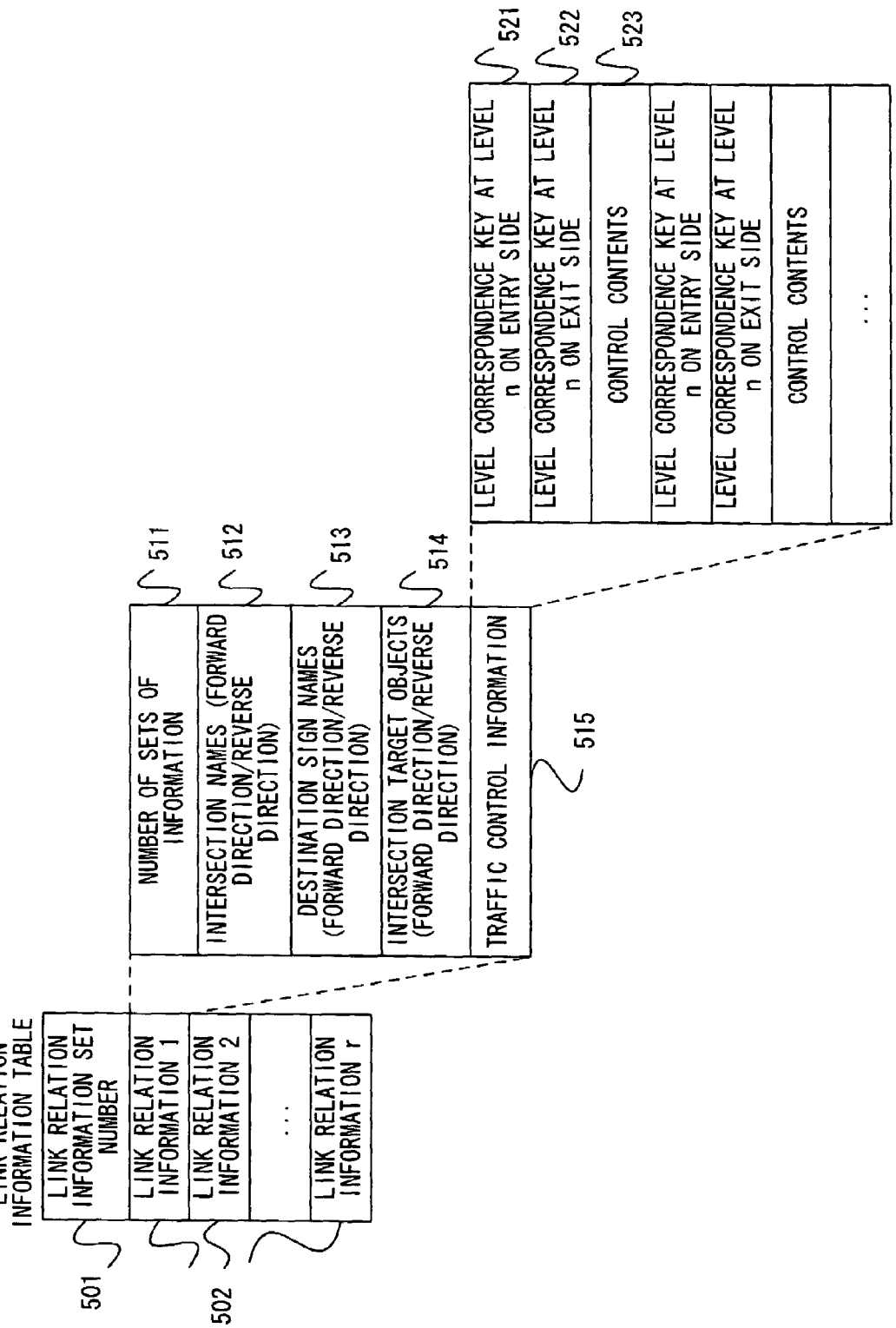
FIG. 9 shows the contents of a link relation information table.

Next, the link relation information table 234 in FIG. 5 is explained. FIG. 9 shows the contents of the link relation information table 234. The link relation information table 234 contains link relation information number 501 indicating the number of sets of link relation information and link relation information 502. In the link relation information table 234, information data related to the relations among all the links present in the subject mesh are stored, with the link relation information number 501 indicating the total number of sets of information data and the information data on the individual link relations stored as the link relation information 502. The link relation information 502 on a given link relation is constituted with data indicating the number of sets of information 511, intersection names (forward direction/reverse direction) 512, destination sign names (forward direction/reverse direction) 513 and intersection target objects (forward direction/reverse direction) 514, traffic control or regulation information 515 and the like period.

The traffic control information 515 is constituted with a level correspondence key 521 at level n on the entry side, a level correspondence key 522 at level n on the exit side and control contents 523. The link relation information is guidance data, which are mainly utilized when providing guidance.

-Managing Map Data Update at Navigation System-

The map data (road/guidance data) adopting the structure described above can be updated in units of individual link strings, in units of individual link attributes or in units of individual link relation information sets in the embodiment. The following is an explanation of a data update and management implemented in units of the individual link strings.

Figure 10:
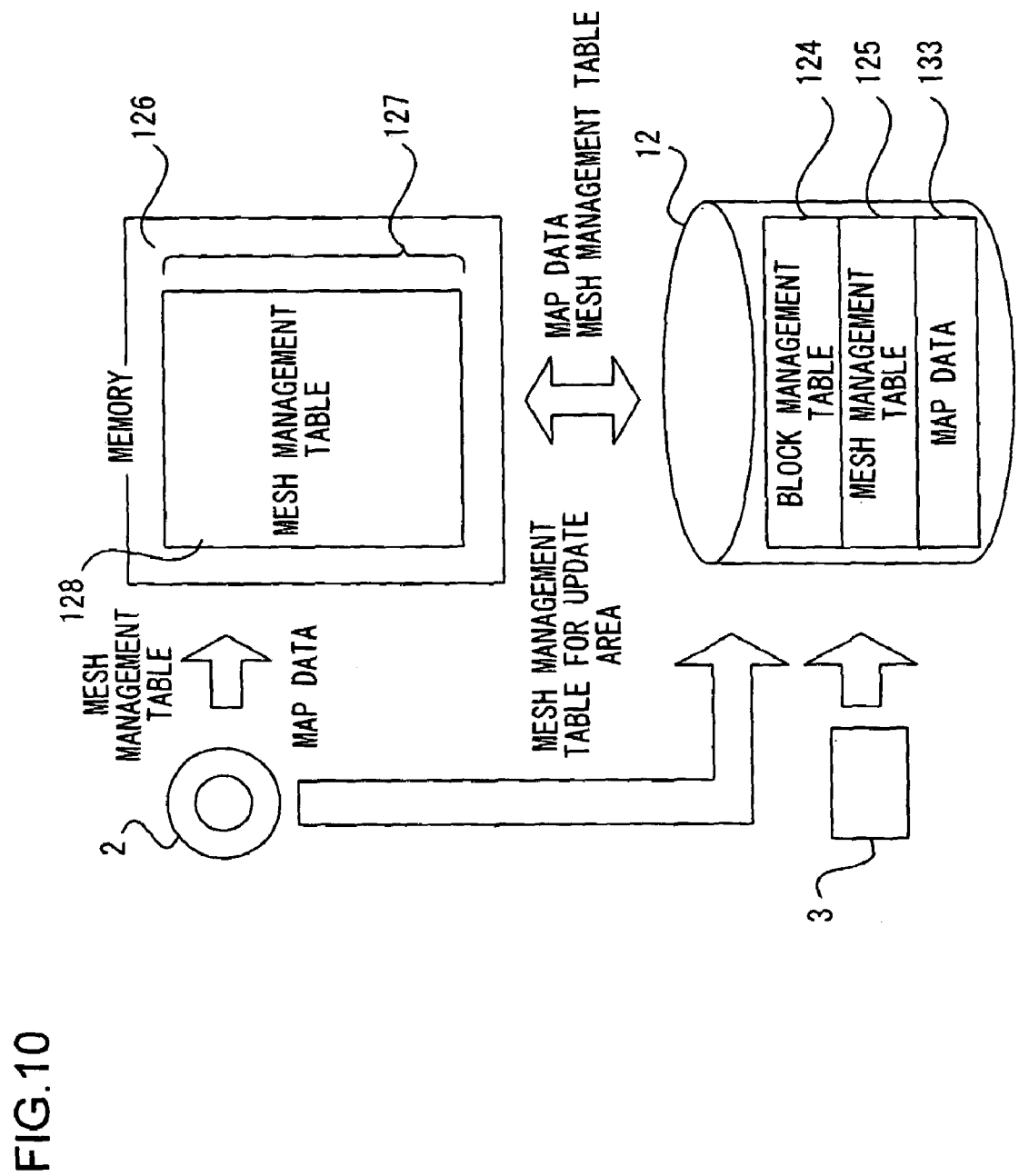
FIG. 10 shows how map data are updated and managed in the navigation system.

FIG. 10 shows how map data are updated and managed in the navigation system 1. The navigation system 1 is able to utilize the latest version of map data by reading out the mesh management tables and the map data from the recording medium 2 and also by reading update map data from the removable memory 3 or from the map server 6 via the Internet 5.

A navigation system in the related art reads data only from a recording medium such as a CD-ROM or a DVD-ROM. The navigation system in the embodiment utilizes the map data in the recording medium 2 and updated map data in combination. For this reason, it includes the nonvolatile memory 12 which is a read/write enabled medium. The nonvolatile memory 12 is constituted with a hard disk or a flash memory and is capable of holding the data recorded therein even when the power to the navigation system is turned off. The nonvolatile memory 12 may be referred to as a cache memory 12 as well.

In the nonvolatile memory 12, the block management tables 124 explained earlier in reference to FIG. 6 are stored. Each block management table 124 contains the identification information used to determine whether the mesh management table of a given block is in the recording medium 2 or in the nonvolatile memory 12 and the access address of the mesh management table. Before new map data are used for the first time, the block management tables stored in the recording medium 2 are read into the nonvolatile memory 12. The block management tables are each initially set at a value that indicates that the mesh management tables corresponding to the individual blocks are stored in the recording medium 2. Subsequently, as map data are updated in units of link strings, a mesh management table 125 is created in the nonvolatile memory 12 for the block containing a mesh along the updated link string and the corresponding block management table 124 is set so as to indicate that the mesh management table of that particular block is now available in the nonvolatile memory 12. The program references the block management table 124 to ascertain whether or not the mesh management table is stored in the recording medium 2 or in the nonvolatile memory 12.

Reference numeral 126 indicates a memory area inside the memory 15 of the navigation system used for mesh management table storage. Hereafter, it is referred to as the memory 126. After judging whether the subject mesh management table is available in the recording medium 2 or in the nonvolatile memory 12, the program reads out the mesh management table from the correct medium and stores the mesh management table thus read out into the memory 126. The mesh management table 127 read into the memory 126 contains the mesh information explained earlier in reference to FIG. 5.

As update data provided in units of individual link strings in a given mesh area are received for the first time from the removable memory 3, the map data in the mesh are read into the nonvolatile memory 12 and are stored as map data 133. Then, data update is executed in units of the individual link strings in the nonvolatile memory 12. At this time, information indicating that the mesh data of the subject mesh are stored in the nonvolatile memory 12 and the address at which the mesh data are stored in the nonvolatile memory 12 are written as the storage location data in the corresponding mesh information at the mesh management table in the nonvolatile memory 12. Subsequently, the nonvolatile memory 12 can be accessed for the mesh data based upon these details. Namely, the map data in a mesh that has never undergone a data update in units of individual link strings are obtained by accessing the recording medium 2, whereas the map data in a mesh that has undergone a data update in units of the individual link strings even once are obtained by accessing the nonvolatile memory 12.

-Update in Units of Individual Link Strings-

Figure 11:
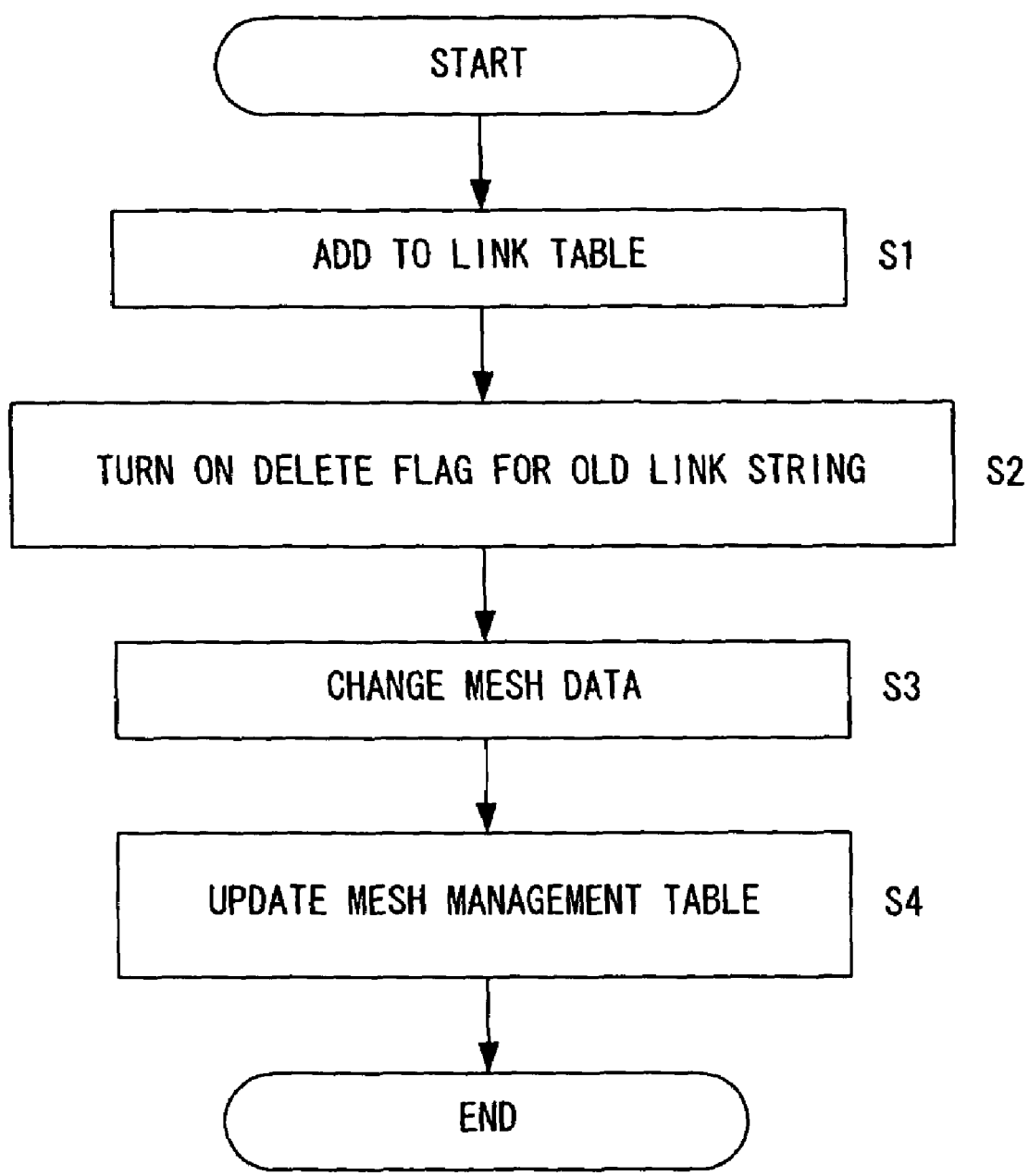
FIG. 11 presents a flowchart of the control implemented when updating data in units of link strings.

Next, a data update executed in units of the individual link strings 302 at the link table 232 in FIG. 7 is explained. FIG. 11 presents a flowchart of the control executed when updating data in units of the individual link strings. The control in FIG. 11 is executed in the control device 11. In addition, a prerequisite to the control in FIG. 11 is that the mesh containing the update target link string is already read into the nonvolatile memory 12. The control device 11 starts the control after verifying that the removable memory 3 is loaded, receiving the link string update data and also verifying that the mesh data corresponding to the mesh containing the update target link string are present in the nonvolatile memory 12.

In step S1, the link string update data having been read are added at the end of the link table 232 in the mesh data 231 of the subject mesh in the nonvolatile memory 12 and the link string number 301 is incremented by 1. The link string update data, which include the data for the entire link string in FIG. 7, are standard link string data themselves. OFF is set for the delete flag 313 in the update data. In step S2, the delete flag 313 in the old link string data corresponding to the update link string data is set in an ON state. This delete flag is used as identification information for determining whether to make the entire link string data valid or invalid. When the delete flag is on, the link string data are made invalid, whereas when the delete flag is off, the link string data are made valid.

In step S3, the link table offset 235, the link table size 236, the link attribute table offset 237, the link attribute table size 238, the link relation information table offset 239 and the link relation information table size 240 in the mesh data 231 are updated in accordance with the updated link table 232. In step S4, the mesh information 212 to 214 corresponding to the subject mesh in the mesh management table is updated. For instance, if the storage address or the data size in the nonvolatile memory 12 has been altered, the new address at which the data are now stored and the new data size are recorded as the storage location data 223 or 226.

It is to be noted that map data are updated in units of individual link attributes and in units of individual sets of link relation information in a manner similar to that with which the map data are updated as described above. The link attribute number 401 in the link attribute table and the link relation information set number 501 in the link relation information table, too, are updated in a similar manner.

-Map Display Control Flowchart-

Figure 12:
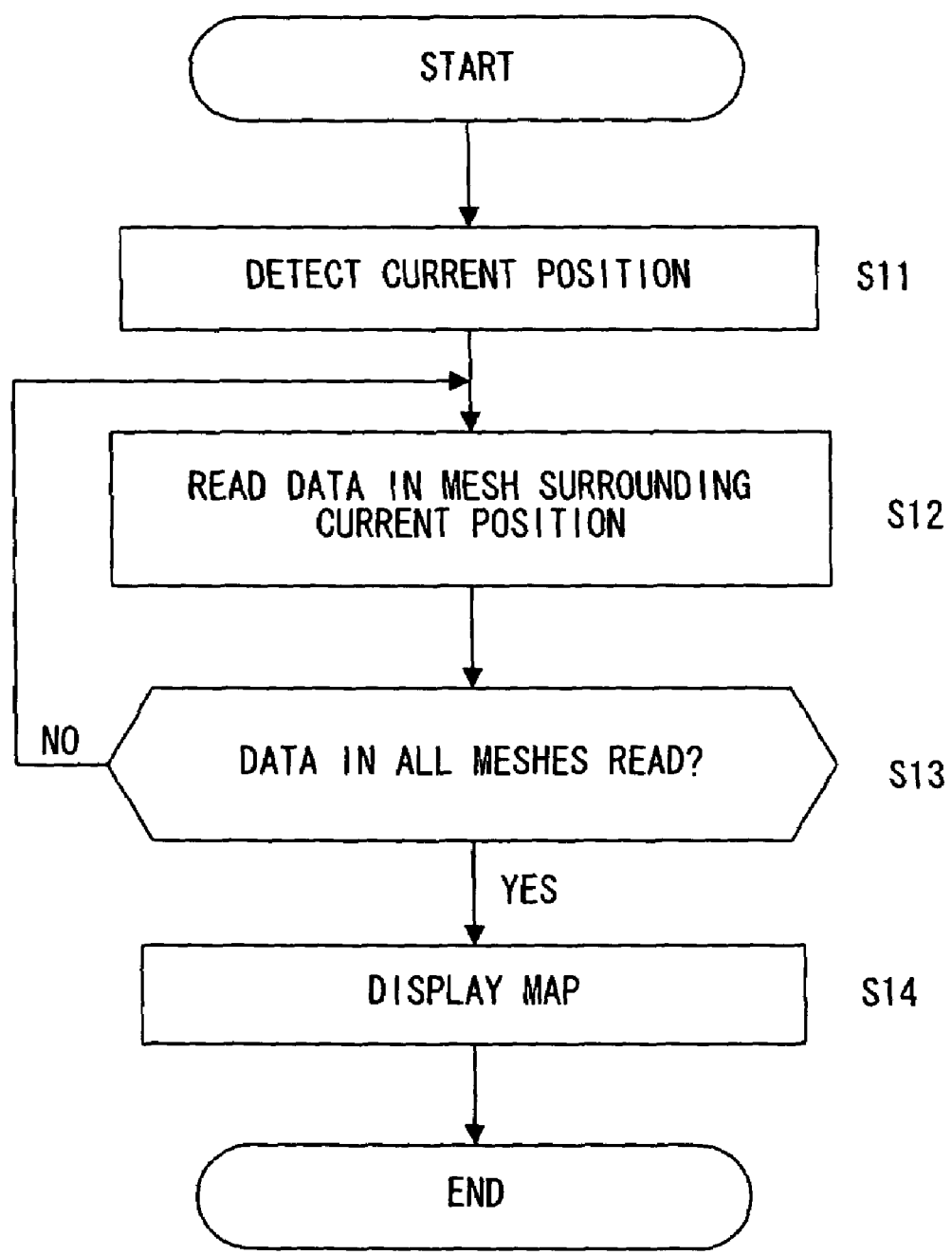
FIG. 12 presents a flowchart of the control implemented by the control device when displaying a map by reading map data (road/guidance data)

FIG. 12 presents a flowchart of the control implemented by the control device 11 when displaying a map by reading the map data (road/guidance data). In step S11, the current position of the vehicle is detected with the current position detection device 13. In step S12, necessary mesh data in a mesh around the current vehicle position are read. In step S13, a decision is made as to whether or not all the necessary mesh data in meshes around the current vehicle position have been read. If it is decided in step S13 that although necessary mesh data have not been read, the operation returns to step S12 to read more mesh data that are necessary in a mesh around the current vehicle position. Upon deciding in step S13 that all the necessary mesh data in the meshes around the current vehicle position have been read, the operation proceeds to step S14 to execute map display processing. It is to be noted that the map display processing is executed by disregarding link string data, link attribute data or link relation information data the corresponding delete flag for which is in an ON state.

Figure 13:
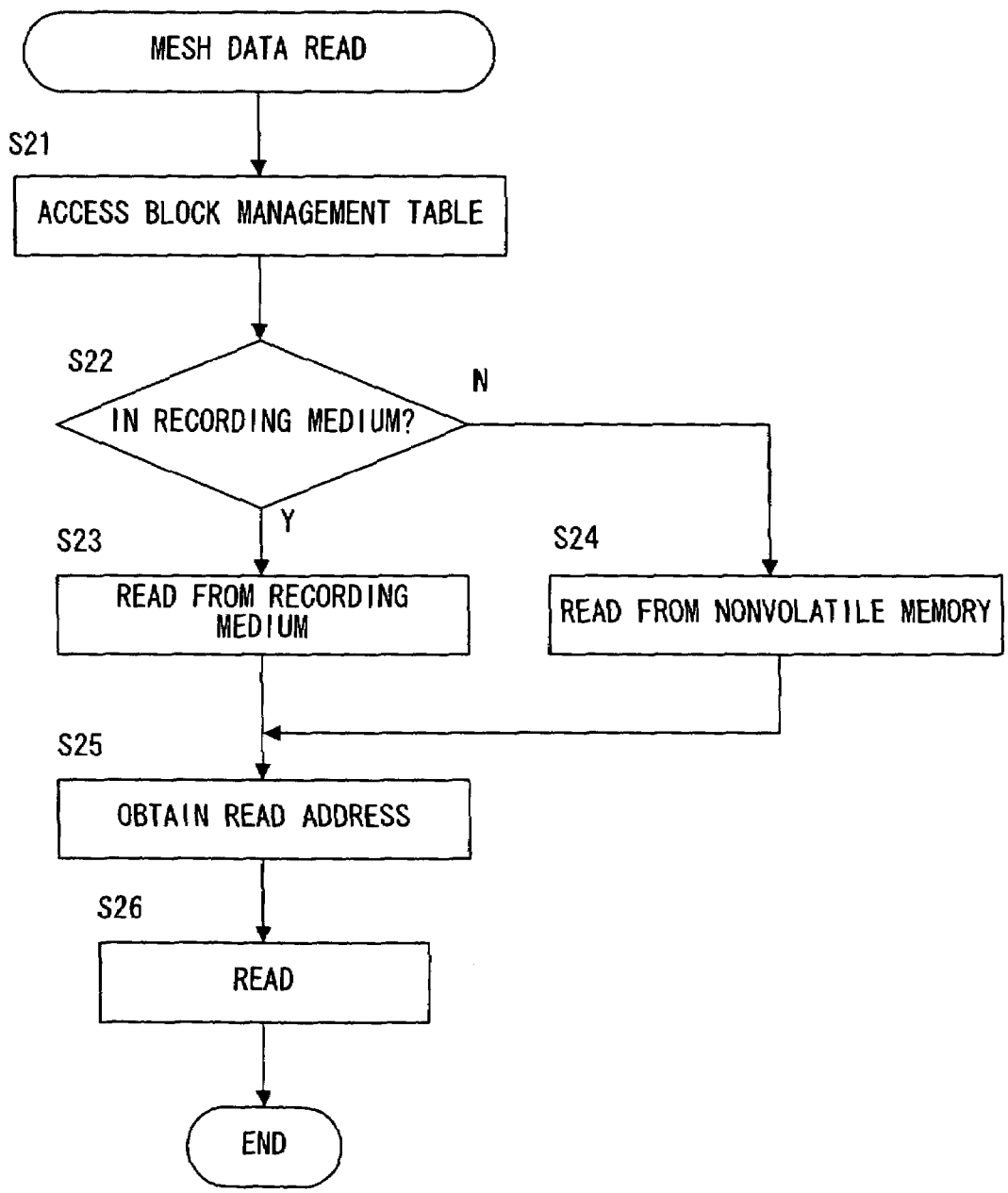
FIG. 13 presents a detailed flowchart of the processing executed in step S12 in FIG. 12.

FIG. 13 presents a detailed flowchart of the processing executed in step S12 in FIG. 12. In step S21, the block management table in the nonvolatile memory 12 is accessed as explained earlier. The explanation is given here on the assumption that the block management table has already been read into the nonvolatile memory 12. In step S22, based upon the contents of the block management table, a decision is made as to whether the mesh management table corresponding to the particular block is available in the recording medium 2 or in the nonvolatile memory 12. The operation proceeds to step S23 if it is decided in step S22 that the mesh management table is in the recording medium 2. In step S23, the mesh management table corresponding to the block is read from the recording medium 2 into the memory 126.

If, on the other hand, it is decided in step S22 that the mesh management table is not available in the recording medium 2, i.e., that the mesh management table is in the nonvolatile memory 12, the operation proceeds to step S24. In step S24, the mesh management table corresponding to the block is read from the nonvolatile memory 12 into the memory 126. In step S25, the storage address of the subject mesh is obtained based upon the contents of the mesh management table having been read into the memory at 126. In step S26, the mesh data are read from the storage address having been ascertained. At this time, if the mesh data have never been updated in units of the individual link strings, the mesh data are read from the recording medium 2. If, on the other hand, mesh data corresponding to a link string in the mesh have been updated even once, the data are read from the nonvolatile memory 12.

The link table in the mesh data is updated in units of individual link strings as described above, and then, the map display processing is executed by using the map data having been updated in units of the individual link strings.

-Background/Name Data-

Next, the background/name data in the map data are explained. As in the case of the road/guidance data, the background/name data, too, at a given level are managed in units of individual blocks and individual meshes. For this reason, the background/name data are managed as illustrated in FIG. 5, with the mesh data 231 in FIG. 5 replaced by mesh data 601 in FIG. 14. FIG. 14 shows the contents of the mesh data constituting the background/name data. The mesh data 601 are basically constituted with a background table 602 and a name table 603. In order to enable access to the individual tables, information indicating a background table offset 604, a background table size 605, a name table offset 606 and a name table size 607 is stored at the beginning of the mesh data 601. For instance, based upon the background table offset 604, the leading address of the background table 602 in the mesh data 601 can be ascertained and thus, data can be read in a volume corresponding to the value (e.g., the number of bytes) stored as the background table size 605. This principle applies to the name table as well.

FIG. 15 shows the contents of the background table 602 in FIG. 14. The term "background" refers to background objects other than roads, such as mountains, the ocean and railways, to be displayed in the road map, and background data include polygon (planar) data, poly line (linear) data and point data used to display the individual background elements. The background table 602 contains background data number 701 indicating the total number of sets of background data in the subject mesh and background data 702 that include sets of background data 1 to s. Each set of background data 702 is constituted with background information 711, history information 712, a delete flag 713, an element point number 714, a start point X coordinate 715, a start point Y coordinate 716, offset coordinates 1 ($\Delta X$, $\Delta Y$) 717, offset coordinate 2 ($\Delta X$, $\Delta Y$) 718, offset coordinates t ($\Delta X$, $\Delta Y$) 719 and an information pointer 720.

The background information 711 includes a size 721, a shape classification (plane, line, point) 722, a drawing order ranking 723, a background attribute 724 and a name offset 725. The background attribute 724 is constituted with a zoom enable flag 731 and a background type code 732.

Figure 16:
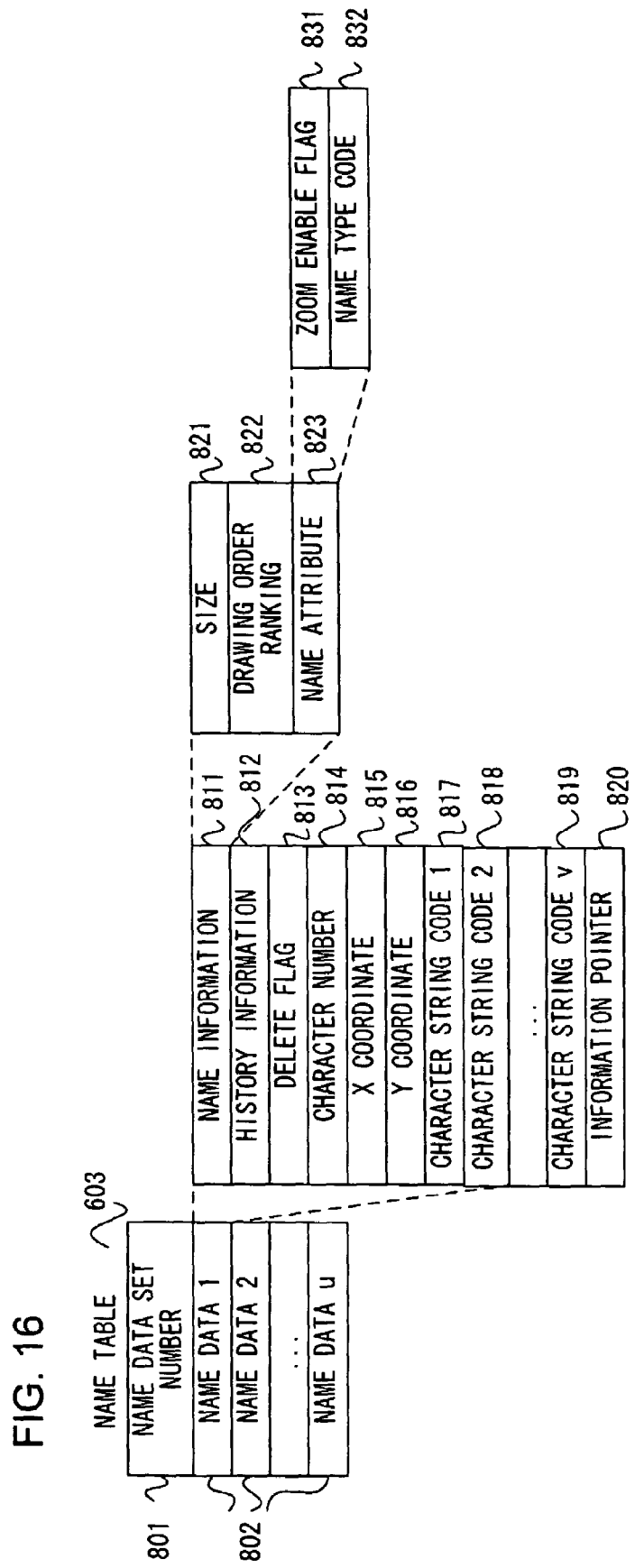
FIG. 16 shows the contents of the name table.

Next, the name table 603 in FIG. 14 is explained. FIG. 16 shows the contents of the name table 603. The term "name" refers to the names of geographic areas, buildings and other objects to be displayed in the road map. The name table 603 contains name data number 801 and name data 802. In the name table 603, all the name data corresponding to the subject mesh are stored, and the name data number 801 indicates the total number of sets of name data in the mesh. Each set of name data 802 is constituted with name information 811, history information 812, a delete flag 813, a character number 814, an X coordinate 815, a Y coordinate 816, a character string code 1 (817), a character string code 2 (818), a character string code v (819) and an information pointer 820.

The name information 811 is constituted with a size 821, a drawing order ranking 822 and a name attribute 823. The name attribute 823 is constituted with a zoom enable flag 831 and a name type code 832.

In the embodiment, the background/name data assuming the structures described above can be updated in units of the individual sets of background data and in units of the individual sets of name data. The update management is executed in a manner similar to that with which the data update in units of individual link strings is managed, and thus, their update management can be understood easily by applying the explanation of the link string update management to the background data or the name data. The background data number 701 in the background table and the name data number 801 in the name table, too, are updated in a similar manner. It is to be noted that prior to an update, the individual sets of background data and the individual sets of name data are both arranged in an order corresponding to the initially set drawing order. If background data or name data become altered, new data are added, some data become deleted or the like as a result of the update, the data can be rearranged in correspondence to the drawing order rankings assigned to the individual sets of data.

-Route Calculation Data-

Next, the route calculation data in the map data are explained. As in the case of the road/guidance data, the route calculation data at a given level are managed in units of individual blocks and individual meshes. For this reason, the route calculation data are managed as illustrated in FIG. 5, with the mesh data 231 in FIG. 5 replaced by mesh data 901 in FIG. 17. FIG. 17 shows the contents of the mesh data constituting the route calculation data. The mesh data 901 are basically constituted with a connection table 902 and a level correspondence table 903. In order to enable access to the individual tables, information indicating a connection table offset 604, a connection table size 905, a level correspondence table 906 and a level correspondence table size 907 is stored at the beginning of the mesh data. For instance, based upon the connection table offset 904, the leading address of the connection table 902 in the mesh data 901 can be ascertained and thus, data can be read in a volume corresponding to the value (e.g., the number of bytes) stored as the connection table size 905. This principle applies to the level correspondence table as well.

FIG. 18 shows the contents of the connection table 902 in FIG. 17. As explained earlier, the route calculation data are network data constituted with branch information and the like that do not bear direct relation to road shapes, and are provided as node connection information. The connection table 902 contains node total number 1001 indicating the total number of nodes present in the subject mesh, link total number 1002 indicating the total number of links present in the mesh and node information 1003 which includes set of node information 1 to w. Each set of node information 1003 is constituted with a node information size 1011, history information 1012, a delete flag 1013, subject node information 1014 and information 1015 provided in correspondence to each of adjacent nodes #1 to #e.

The subject node information 1014 is constituted with adjacent node number+X coordinate 1021, a higher-order level present flag 1022, subject node road type code+Y coordinate 1023, lower-order level normalized coordinates (X, Y) 1024 and a lower-order level ID No. (K) 1025. In the embodiment, the subject node information contains the lower-order level normalized coordinates (X, Y) 1024 and the lower-order level ID No. (K) 1025 in addition to the normalized coordinate values of the X coordinate 1021 and the Y coordinate 1023. A level correspondence key to constitute a subject node ID No. is formed by combining the X coordinate 1021 and the Y coordinate 1023 with the lower-order level normalized coordinates (X, Y) 1024 and the lower-order level ID No. (K) 1025. The concept of the level correspondence key has been explained in reference to the road/guidance data.

Each set of adjacent node information 1015 is constituted with link type code+X coordinate 1031, higher-order level present flag+Y coordinate 1032, lower-order level normalized coordinates (X, Y) 1033, a lower-order level ID No. (K) 1034, a traffic control (traveling code) yes/no flag 1035, outside map perimeter flag+map perimeter direction data 1036, an adjacent node road type code 1037, a link road type code 1038, a road width+bypass flag 1039, speed limit+link length+average traveling time data 1040 and a traveling code (one to four words) 1041. A level correspondence key to constitute an adjacent node ID No. is also generated by combining the X coordinate 1031 and the Y coordinate 1032 with the lower-order level normalized coordinates (X, Y) 1033 and the lower-order level ID No. (K) 1034 for each adjacent node.

Figure 19:
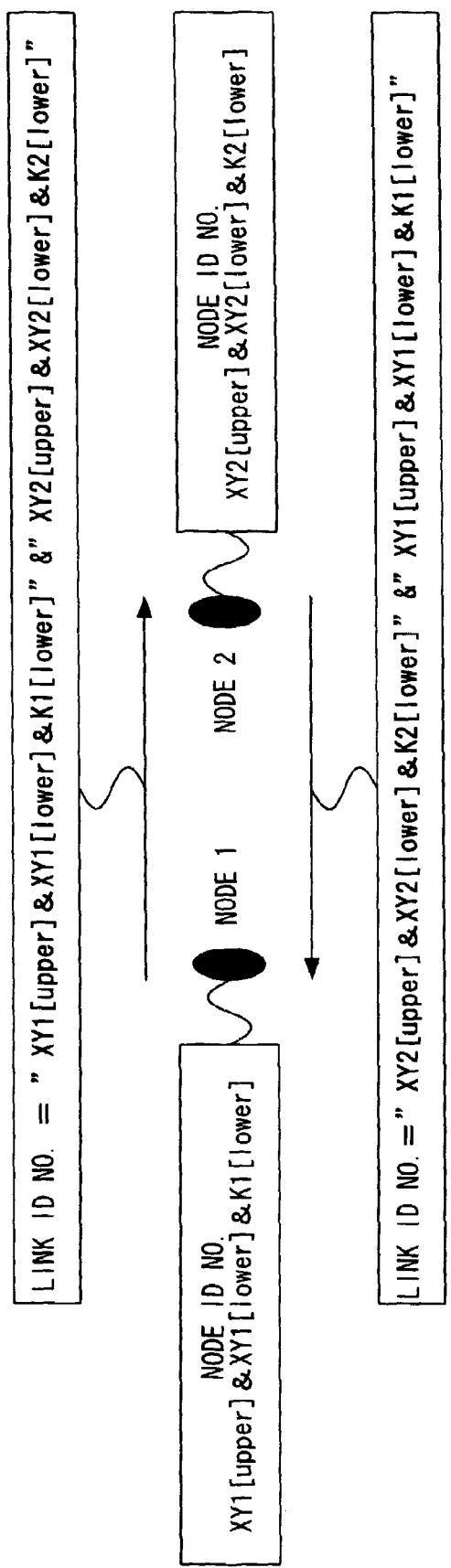
FIG. 19 is a conceptual diagram of the relationship between node ID Nos. and link ID Nos.

Based upon the subject node ID No. and the adjacent node ID No. described above, a link ID No. of the link between the subject node and the adjacent node is defined. Thus, nodes and links at a given level can be identified with a high degree of reliability and the correspondence between different levels can be accurately ascertained in the route calculation data as well. FIG. 19 is a conceptual diagram of the relationship between the node ID Nos. and the link ID Nos. assigned with relation to a node 1 and a node 2 adjacent to each other. The node ID No. of a given node constitutes the subject node information of the node, and it is also used as adjacent node information at a node adjacent to the node. The link ID Nos. include a forward-direction link ID No. and a reverse direction link ID No. defined by switching the order of the arrangement of individual node ID Nos.

A route display achieved by using node ID Nos. and link ID Nos. is now explained. When a given route is calculated by using the route calculation data, the node ID Nos. of the nodes present on the route are obtained. Based upon the obtained node ID Nos., the road/guidance data can be accessed in order to obtain the data needed for the route display. In this situation, specific link ID Nos. with directional information indicating the direction along which the nodes are connected can be identified based upon the order in which the nodes are arranged. By using the link ID Nos. with the directional information thus identified, the data needed to display the route can be obtained. For instance, even an intersection bearing different names for traffic going in opposite directions can be displayed with the correct intersection name.

Figure 20:
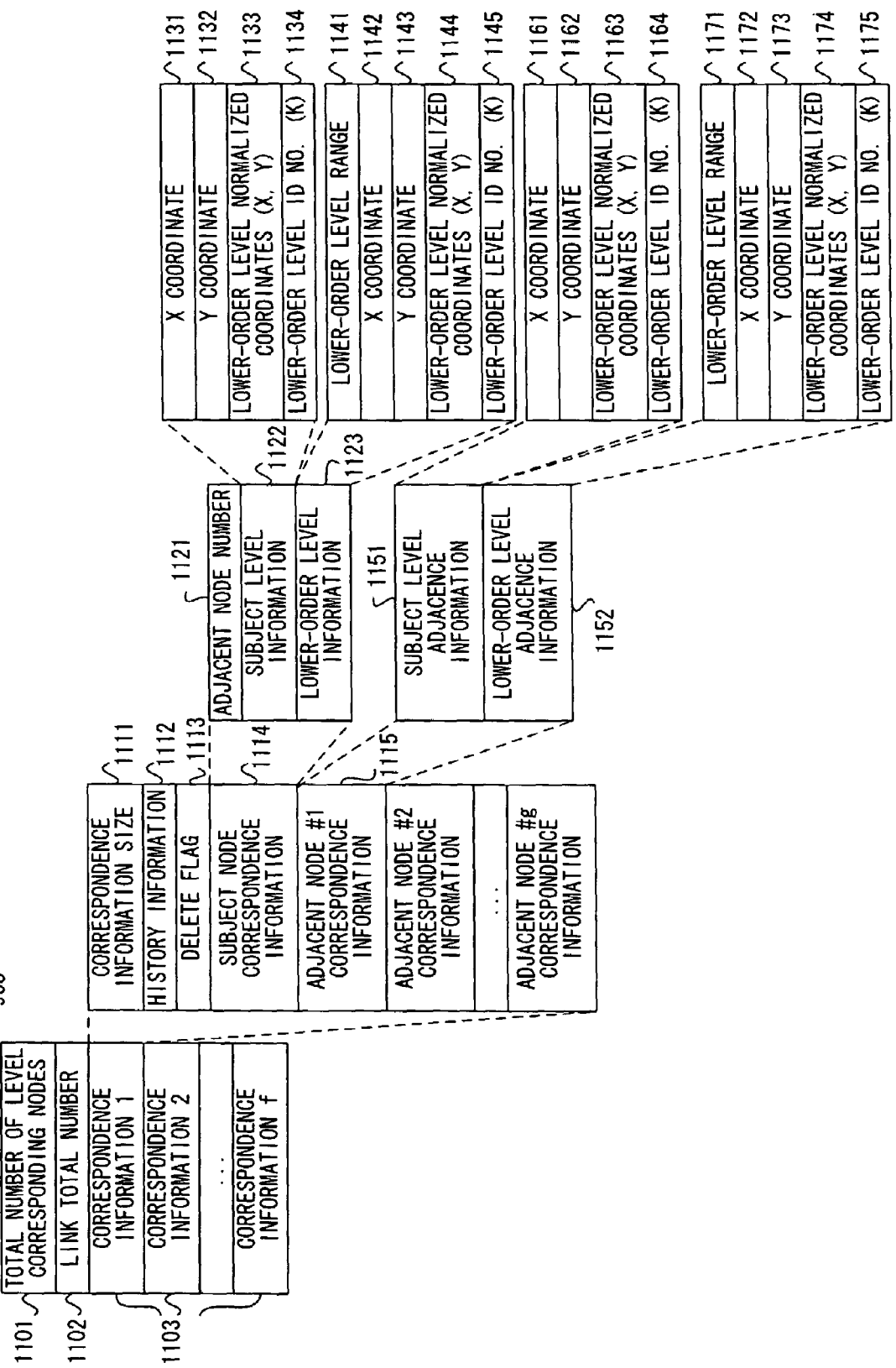
FIG. 20 shows the contents of the level correspondence table.

Next, the level correspondence table 903 in FIG. 17 is explained. FIG. 20 shows the contents of the level correspondence table 903. In the level correspondence table 903, information indicating the correspondence between the nodes at the subject level and specific nodes in specific meshes at a lower-order level is stored.

The level correspondence table 903 contains level corresponding node total number 1101 indicating the total number of nodes in the subject mesh in correspondence to which level correspondence information is provided, link total number 1102 indicating the total number of links in the mesh and correspondence information 1103 that includes sets of correspondence information 1 to f. Each set of correspondence information 1103 is constituted with a correspondence information size 1111, history information 1112, a delete flag 1113, subject node correspondence information 1114 and adjacent node information 1115 provided in correspondence to each of adjacent nodes #1 to #g.

The subject node correspondence information 1114 is constituted with adjacent node number data 1121, subject level information 1122 and lower-order level information 1123. The subject level information 1122 indicates an X coordinate 1131, a Y coordinate 1132, lower-order level normalized coordinates (X, Y) 1133 and a lower-order level ID No. (K) 1134. The level correspondence key is generated by combining these contents and the resulting level corresponding key is used as the subject node ID No. of the subject node at the subject level. The lower-order level information 1123 is constituted with a lower-order level presence range 1141, an X coordinate 1142, a Y coordinate 1143, lower-order level normalized coordinates (X, Y) 1144 and a lower-order level ID No. (K) 1145. A level correspondence key is generated in a similar manner by combining the x-coordinate 1142 and the y-coordinate 1143 with the lower-order level normalized coordinates (X, Y) 1144 and the lower-order level ID No. (K) 1145 to be used as the subject node ID No. of the subject node at the lower-order level.

Each set of adjacent node correspondence information 1115 is constituted with subject level adjacence information 1151 and lower-order level information 1152. The subject level adjacence information 1151 indicates an X coordinate 1161, a Y coordinate 1162, lower-order level normalized coordinates (X, Y) 1163 and a lower-order level ID No. (K) 1164. A level correspondence key is generated by combining these contents and the resulting level corresponding key is used as the adjacent node ID No. of the adjacent node at the subject level. The lower-order level adjacence information 1152 is constituted with a lower-order level presence range 1171, an X coordinate 1172, a Y coordinate 1173, lower-order level normalized coordinates (X, Y) 1174 and a lower-order level ID No. (K) 1175. A level correspondence key is generated in a similar manner by combining the x-coordinate 1172 and the y-coordinate 1173 with the lower-order level normalized coordinates (X, Y) 1174 and the lower-order level ID No. (K) 1175 to be used as the adjacent node ID No. of the adjacent node at the lower-order level.

In the embodiment, the route calculation data assuming the structure described above can be updated in units of the individual sets of node information and in units of the individual sets of link relation information. The update management is executed in a manner similar to that with which the data update in units of individual link strings is managed and thus, their update management can be understood easily by applying the explanation of the link string update management to the node information or the link relation information. The node total number 1001 and the link total number 1002 in the connection table and the level correspondence total number 1101 and the link total number 1102 in the level correspondence table, too, are updated in a similar manner The map data structure achieved in the embodiment as described above and the navigation system adopting the data structure achieve the following advantages.

(1) The road/guidance data can be updated in units of individual link strings, in units of individual link attributes and in units of individual sets of link relation information, the background/name data can be updated in units of individual background display objects such as polygons, poly lines and points and in units of individual names, and the route calculation data can be updated in units of individual sets of node information and in units of individual sets of level correspondence information. Namely, the map-related information can be updated in units of individual information elements constituting the information. Thus, when the map data are only partially updated, the entire recording medium such as a DVD-ROM having stored therein the map data does not need to be replaced with a new recording medium. In addition, since a data update can be executed on the basis of the smallest units of data, the volume of the data that need to be communicated (the communication cost) at the time of the data update can be reduced. The length of time required for the data update, too, can be reduced. The "information elements" constituting the map-related information refer to elements, the specific types of which are each defined in correspondence to a given function, a given purpose of use or the like of the information or the data, and thus, they may instead be referred to as information or data types, each defined in correspondence to a specific function, a specific purpose of use or the like.

(2) Information elements such as link strings each include a delete flag, and thus, it is not necessary to delete or replace each set of old data. It is to be noted that the old data may be deleted and replaced with the new update data instead of providing a delete flag.

(3) The management tables used to manage the map data are stored in the nonvolatile memory and the contents of the relevant management table can be updated each time an information element such as a link string is updated. Thus, data can be updated in a single unit of information element such as a link string and also the updated data can be easily accessed subsequently.

(4) Since mesh data containing the update target information element such as a link string are stored in the nonvolatile memory, the update data can be added or used for an overwrite, and the management information can be updated after the addition of or the overwrite with the update data with ease. In addition, even when the power to the apparatus is turned off, the update data are retained.

(5) The node position information is constituted as a level correspondence key generated by combining the subject level position information with lower-order level position information, and as a result, each node can be identified with a high degree of reliability and the specific node correspondence at different levels can be ascertained with ease.

(6) Since a link ID No. of a given link at a given level is defined by using level correspondence keys (node ID Nos.), the link can be identified with a high degree of reliability and the link correspondence over different levels can be ascertained with ease as well. In addition, by switching the order of the level correspondence keys, a forward-direction link ID No. and a reverse direction link ID No. are defined so as to allow a reliable identification on the forward-direction link ID No. or the reverse direction link ID No. The link ID Nos. defined as described above are utilized with a high level of effectiveness when it is necessary to specify the link direction when providing the route display and the route guidance based upon the results of the route calculation, for instance.

(7) Since the background data and the name data include the drawing order information, the data arrangement can be readjusted in correspondence to the drawing order when the data are updated in units of the individual information elements. As a result, the data update does not lower the drawing speed.

(8) Since the update data can be provided through communication via the Internet, the latest version of update data is made available promptly and at low cost.

(9) Since the two-dimensional coordinate values corresponding to the specific latitude/longitude are used as the node position information indicating the position of each node, the data can be updated regardless of the model type or the specifications of the navigation system. Namely, since the two-dimensional coordinates corresponding to the latitude/longitude are universal data, the data update method can be standardized by using these data.

(10) Since a parameter other than the two-dimensional coordinate values is also used to generate a level correspondence key, each node can be identified with an even higher degree of reliability. For instance, by using height data as an additional parameter, even a connecting point at an elevated intersection can be reliably identified.

While an explanation is given above in reference to the embodiment on an example in which the control program executed by the control device 11 of the navigation system is stored in the ROM, the present invention is not limited to this example. The control program and the installation program may be provided in a recording medium such as a DVD. It is to be noted that the recording medium does not need to be a DVD, and the programs may be provided in any of various types of recording media including a CD-ROM and magnetic tape.

In addition, the programs may be provided via a transmission medium such as a communication line, a typical example of which is the Internet. Namely, the programs may be converted to signals on a carrier wave that carries a transmission medium and be transmitted as signals. When providing the programs in the recording medium or via the Internet, a configuration similar to that shown in FIG. 1 may be adopted. For instance, the recording medium 2 may be used as a recording medium having recorded therein the programs and the map server 6 may serve as a server that provides the application program. In other words, the programs can be distributed in the form of a computer-readable computer program product adopting any of various modes such as a recording medium and a carrier wave.

Furthermore, the control program described above may be executed on a personal computer so as to enable the personal computer to function as a car navigation system. In such a case, the current position detection device 13, the input device 19 and the like should be connected to specific I/O ports of the personal computer.

While an explanation is given above in reference to the embodiment on an example in which update data are obtained from the removable memory 3, the present invention is not limited to this example. For instance, the update data may be provided by temporarily replacing the recording medium 2 with a CD-ROM or a DVD-ROM having written therein the update data, instead.

While an explanation is given above in reference to the embodiment on an example in which the initial map data are read from the recording medium 2, the present invention is not limited to this example. The initial map data may instead be downloaded via the Internet 5, stored into the nonvolatile memory 12 and then updated and managed through the method described earlier. Alternatively, necessary map data may be received via the Internet 5 as they become needed, the map data may be stored into the nonvolatile memory 12 each time they are received and then they may be updated and managed through the method described earlier whenever they are updated subsequently. In other words, the map data can be distributed in the form of a map data product that can be read by a computer or a navigation system (map data processing apparatus), adopting any of various modes such as a recording medium and a carrier wave.

While the nonvolatile memory 12 is provided as an internal memory of the navigation system 1 in the embodiment explained above, the present invention is not limited to this example. An external storage device connected via a cable or the like may be used instead, for instance.

While the map data are provided in correspondence to a plurality of levels and level correspondence keys each generated by combining the normalized coordinates of a node at the subject level and the normalized coordinates at the lower-order level in the embodiment explained above, the present invention is not limited to this example. For instance, the sets of coordinates of all the nodes may each be indicated by using the position information related to the specific latitude/longitude at the resolution available at the most detailed level. For instance, each set of node coordinates may be indicated directly by using the absolute latitude/longitude at a predetermined resolution level. Alternatively, the node coordinates may be indicated by combining the position information related to the latitude/longitude at a predetermined resolution level with the ID number (K) such as the node height data or the update time data described earlier.

While an explanation is given above in reference to the embodiment on an example in which the individual sets of road/guidance data and route calculation data are updated by using the individual sets of update data provided in matching information element units, e.g., link string units and node information set units, the present invention is not limited to this example. For instance, update data provided in units of link strings to update the road/guidance data may be used to update the link table in units of link strings and to update the connection table in the route calculation data in units of node information sets, since the update data provided in units of link strings include node position information and control information and thus update data for the route calculation data can be generated based upon such node position information and control information. In addition, individual sets of data may be updated by using common update data provided in a specific format that can be commonly used to update the road/guidance data, the background/name data and the route calculation data in units of specific information elements. In such a case, a program through which update data provided in units of information elements of a specific type to be used to update each type of data are generated from the common update data conforming to the specific format should be installed in the navigation system 1. Since this reduces the volume of the communication data, an update can be executed even faster.

While the invention has been particularly shown and described with respect to a preferred embodiment and variations thereof by referring to the attached drawings, the present invention is not limited to these examples and it will be understood by those skilled in the art that various changes in form and detail may be made therein without departing from the spirit, scope and teaching of the invention.

The invention claimed is:

1. A data product readable by one of a computer and a map data processing apparatus, comprising:
   map data including map-related information related to a map, wherein:
   the map-related information includes a compilation of a plurality of information elements;
   the map-related information being updateable in units of the individual information elements at the map data processing apparatus; and
   the information elements each include identification information indicating whether information pertaining to the information element is valid or invalid; and
   the identification information of an information element that has been updated and become old is set invalid.

2. A data product readable by one of a computer and a map data processing apparatus, comprising:
   map data including map-related information related to a map, wherein:
   the map-related information includes a compilation of a plurality of information elements;
   the map-related information being updateable in units of the individual information elements at the map data processing apparatus;
   the map-related information includes management information used to manage the map-related information, which is also updated when the map-related information is updated in units of the individual information elements; and
   roads are each indicated as a link string having a plurality of continuous links, with nodes representing points on the roads and each link representing a road portion connecting two adjacent nodes; and
   the information elements each correspond to information related to a link string and the map-related information is updated in units of link strings.

3. A data product according to claim 2, wherein:
   the information related to the link string includes node position information indicating a position of a node contained in the link string.

4. A data product according to claim 2, wherein:
   the information related to the link string includes guidance information related to the link string.

5. A data product according to claim 3, wherein:
   a plurality of levels each corresponding to one of a plurality of scaling factors of the map are defined;
   a level corresponding to a scaling factor with a smaller value that renders the map as a wider area map is designated as a higher-order level;
   a plurality of sets of map-related information are provided each in correspondence to one of the plurality of levels; and
   the node position information included in the information related to the link string at a specific level contains node position information of a node at the specific level and node position information on a node at a lower-order level corresponding to the node at the specific level.

6. A data product readable by one of a computer and a map data processing apparatus, comprising:
map data including map-related information related to a map, wherein:
the map-related information includes a compilation of a plurality of information elements;
the map-related information being updateable in units of the individual information elements at the map data processing apparatus;
the map-related information includes management information used to manage the map-related information, which is also updated when the map-related information is updated in units of the individual information elements;
the map-related information is information related to a background used to display a road map;
the information elements each constitute information related to a background object corresponding to a single display management unit;
the information related to a background object corresponding to the single display management unit includes information indicating a drawing order; and
the map-related information assumes a structure that allows a rearrangement of a plurality of sets of information each related to a background object corresponding to the single display management unit which are grouped together, in correspondence to the drawing order when one of the plurality of sets of information each related to a background object corresponding to the single display management unit is updated.

7. A data product according to claim 6, wherein:
the information related to a background object corresponding to the single display management unit is information with regard to a single polygon, a single poly line or a single point related to the background.

8. A data product according to claim 2, wherein the data product is a recording medium having recorded therein the map data.

9. A data product readable by one of a computer and a map data processing apparatus, comprising:
map data including map-related information related to a map, wherein:
the map-related information includes a compilation of a plurality of information elements;
the map-related information being updateable in units of the individual information elements at the map data processing apparatus;
the map-related information includes management information used to manage the map-related information, which is also updated when the map-related information is updated in units of the individual information elements;
the information elements each correspond to information related to a single name used to display a road map;
the information related to a single name includes information indicating a drawing order; and
the map-related information assumes a structure that allows a rearrangement of a plurality of sets of information each related to a single name which are grouped together, in correspondence to the drawing order when one of the plurality of sets of information related to a single name is updated.

10. A map data processing apparatus, comprising:
a recording medium drive unit having loaded therein a recording medium having recorded therein map data, readable by one of a computer and a map data processing apparatus, the recording medium comprising:
map data including map-related information related to a map, wherein:
the map-related information includes a compilation of a plurality of information elements;
the map-related information being updateable in units of the individual information elements at the map data processing apparatus;
the map-related information includes management information used to manage the map-related information, which is also updated when the map-related information is updated in units of the individual information elements;
roads are each indicated as a link string having a plurality of continuous links, with nodes representing points on the roads and each link representing a road portion connecting two adjacent nodes; and
the information elements each correspond to information related to a link string and the map-related information is updated in units of link strings;
a nonvolatile memory;
an update data acquisition unit that acquires update data used to update map-related information in units of the individual information units and stores the update data into the nonvolatile memory; and
a processing unit that processes map data based upon the map data recorded in the recording medium and the update data stored in the nonvolatile memory.

11. A data product readable by one of a computer and a map data processing apparatus, comprising:
map data including map-related information related to a map, wherein:
the map-related information includes a compilation of a plurality of information elements;
the map-related information being updateable in units of the individual information elements at the map data processing apparatus;
the map-related information includes management information used to manage the map-related information, which is also updated when the map-related information is updated in units of the individual information elements;
points on roads constitute nodes;
the map-related information is information related to connections of the nodes used for route calculation;
the information elements each correspond to information managed in a single node unit;
a plurality of levels each corresponding to one of a plurality of scaling factors of the map are defined;
a level corresponding to a scaling factor with a smaller value that renders the map as a wider area map is designated as a higher-order level;
a plurality of sets of map-related information are provided each in correspondence to one of the plurality of levels; and
node position information included in the information managed in the single node unit at a specific level contains node position information on a node at the specific level and node position information on a node at a lower corresponding to the node at the specific level.

12. A data product according to claim 11, wherein:
the information managed in the single node unit includes information related to a subject node and information related to a node adjacent to the subject node.

13. A data product readable by one of a computer and a map data processing apparatus, comprising:
map data including map-related information related to a map, wherein:

points on roads constitute nodes and road portions extending between adjacent nodes are indicated as links;

information used to identify each of the nodes includes node position information related to latitude and longitude; and a link ID used to identify each of the links having a map scaling factor, configured to include a combination of the node position information related to the latitude and longitude, and a linking parameter identifying a corresponding node with a lower map scaling factor of a node at one end of a target link and the node position information related to the latitude and longitude, and a linking parameter identifying a corresponding node with the lower map scaling factor of a node at another end of the target link.

14. A data product readable by one of a computer and a map data processing apparatus, comprising:

map data including map-related information related to a map, wherein:

the map-related information includes a compilation of a plurality of information elements;

the map-related information being updateable in units of the individual information elements at the map data processing apparatus;

the map-related information includes management information used to manage the map-related information, which is also updated when the map-related information is updated in units of the individual information elements;

points on roads constitute nodes;

the map-related information is information related to connections of the nodes used for route calculation;

a plurality of levels each corresponding to one of a plurality of scaling factors of the map are defined;

a level corresponding to a scaling factor with a smaller value that renders the map as a wider area map is designated as a higher-order level;

a plurality of sets of map-related information are provided each in correspondence to one of the plurality of levels; and the information elements each constitute information related to a node at a lower-order level corresponding to information related to a node at a specific level.

15. A data product according to claim 14, wherein:

node position information included in the information related to the node contains position information on the node at a level having contained therein the node and position information on a node at a lower-order level corresponding to the node at the level having contained therein the node.

16. A data product according to claim 13, wherein:

a plurality of levels each corresponding to one of a plurality of scaling factors of the map are defined;

a level corresponding to a scaling factor with a smaller value that renders the map as a wider area map is designated as a higher-order level;

a plurality of sets of map-related information are provided in each in correspondence to one of the plurality of levels; and the node position information at a specific level contains node position information on a node at the specific level and node position information on a node at a lower-order level corresponding to the node at the specific level.

17. A data product according to claim 13, wherein:

the link ID specifies a direction of the target link in correspondence to an order with which the node position information related to the latitude and longitude of the node at the one end of the target link and the node position information related to the latitude and longitude of the node at the other end of the target link are combined.

* * * * *